United States Patent
Krishnamurthy

(10) Patent No.: US 9,451,614 B2
(45) Date of Patent: Sep. 20, 2016

(54) SYSTEM AND METHODS FOR IMPROVING PERFORMANCE OF A MULTI-SIM WIRELESS DEVICE OPERATING IN SINGLE-SIM OR MULTI-SIM STANDBY MODE

(71) Applicant: QUALCOMM Incorporated, San Diego, CA (US)

(72) Inventor: Saiprasad Krishnamurthy, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 14/336,772

(22) Filed: Jul. 21, 2014

(65) Prior Publication Data

US 2016/0021660 A1    Jan. 21, 2016

(51) Int. Cl.
| H04W 72/04 | (2009.01) |
| G06F 9/50 | (2006.01) |
| H04W 68/02 | (2009.01) |
| H04B 1/3816 | (2015.01) |
| H04W 52/02 | (2009.01) |
| H04W 36/00 | (2009.01) |
| H04W 48/16 | (2009.01) |
| H04W 60/00 | (2009.01) |

(52) U.S. Cl.
CPC ........ *H04W 72/0453* (2013.01); *G06F 9/5094* (2013.01); *H04B 1/3816* (2013.01); *H04W 52/028* (2013.01); *H04W 68/02* (2013.01); *H04W 36/0088* (2013.01); *H04W 48/16* (2013.01); *H04W 60/005* (2013.01)

(58) Field of Classification Search
None
See application file for complete search history.

(56) References Cited

U.S. PATENT DOCUMENTS

| 2003/0181216 A1 | 9/2003 | Tsai et al. | |
| 2004/0043798 A1* | 3/2004 | Amerga | H04B 1/70753 455/574 |
| 2011/0117965 A1* | 5/2011 | Gong | H04W 48/18 455/558 |
| 2011/0244880 A1 | 10/2011 | Chin et al. | |
| 2013/0231104 A1 | 9/2013 | Lindoff et al. | |
| 2014/0004842 A1* | 1/2014 | Lindoff | H04W 88/06 455/418 |
| 2014/0036710 A1 | 2/2014 | Chin et al. | |
| 2014/0064113 A1 | 3/2014 | Burhan et al. | |
| 2015/0065132 A1* | 3/2015 | Ramkumar | H04W 52/0241 455/435.3 |
| 2015/0289141 A1* | 10/2015 | Ghasemzadeh | H04W 72/044 370/330 |

FOREIGN PATENT DOCUMENTS

| WO | 2011109750 A1 | 9/2011 |
| WO | 2012171542 A1 | 12/2012 |
| WO | 2013093777 A2 | 6/2013 |

OTHER PUBLICATIONS

International Search Report and Written Opinion—PCT/US2015/037691—ISA/EPO—Oct. 12, 2015.

* cited by examiner

*Primary Examiner* — Daniel Lai
(74) *Attorney, Agent, or Firm* — The Marbury Law Group, PLLC

(57) ABSTRACT

Methods and devices are disclosed for enabling improved efficiency and performance in idle mode processes on a multi-SIM wireless communication device currently operating in single SIM or multiple SIM multiple standby mode. After determining that the first SIM and/or second SIM are using the first RF resource and the second RF resource is unavailable, the wireless device may determine whether the first RF resource is operating in idle mode. Upon determining that the first RF resource is in idle mode, the wireless device may identify at least one idle-mode task to be performed by the first RF resource, identify parallelism parameters, identify possible parallelism task combination sets based on the at least one identified idle-mode task and the parallelism parameters, select a best parallelism task combination set, and assign parallel tasks to the first and second RF resources according to the selected parallelism task combination set.

30 Claims, 9 Drawing Sheets

SYSTEM AND METHODS FOR IMPROVING PERFORMANCE OF A MULTI-SIM WIRELESS DEVICE OPERATING IN SINGLE-SIM OR MULTI-SIM STANDBY MODE

BACKGROUND

Multi-SIM (subscriber identification module) wireless devices have become increasing popular because of their flexibility in service options and other features. One type of multi-SIM wireless device, a dual-SIM-dual-active (DSDA) device, allows simultaneous active connections with the networks corresponding to two SIMs. DSDA devices typically have separate radio-frequency (RF) transceivers associated with each SIM, each of which may also be equipped with primary and diversity receive chains.

For various reasons, such as to conserve power, a DSDA device user may select to implement a single-SIM mode, in which the device operates on only one SIM and corresponding RF resource. Further, a DSDA device user may instead select to implement a dual-SIM dual standby mode (DSDS) in which both SIMs are enabled for communication but which share the use of one of the RF resources. When in idle mode, the RF resource performs idle-mode tasks for one SIM (single-SIM mode) or both SIMs (in DSDS mode) during wake-up periods between periods of sleep in a power saving mode cycle. However, since such wake-up periods may be short, depending on network conditions, one or multiple idle-mode tasks may be dropped and/or prolonged over more than one wake-up period. As a result, operation in the single SIM or DSDS mode may ultimately increase power consumption as well as degrade performance.

SUMMARY

Systems, methods, and devices of various embodiments enable a multi-SIM wireless communication device on which all enabled SIMs are using a first radio-frequency (RF) resource to improve efficiency and performance by determining whether the first RF resource is in idle mode, and in response to determining that the first RF resource is in idle mode, identifying at least one idle-mode task to be performed by the first RF resource, identifying parallelism parameters that provide criteria to assist scheduling simultaneous idle-mode tasks, identifying possible parallelism task combination sets based on the at least one identified idle-mode task and the parallelism parameters, selecting a best parallelism task combination set, and assigning parallel tasks to the first and second RF resources according to the selected parallelism task combination set. Embodiment methods may also include activating the second RF resource and simultaneously performing, on the first and second RF resources, the assigned parallelism tasks during a wake-up period of at least one subsequent power saving mode cycle associated with the first RF resource.

In some embodiment systems, methods and devices, identifying the possible parallelism task combination sets may be performed by inputting the at least one identified idle-mode task and the parallelism parameters to a rule engine. In some embodiment systems, methods and devices, identifying the possible parallelism task combination sets may be performed using the at least one identified idle-mode task and the parallelism parameters to locate information stored in a data structure on the wireless device. In some embodiment systems, methods and devices, the parallelism parameters may include at least one of a duration of a wake-up period of a power saving mode cycle associated with the first RF resource, a history of recent idle mode activity for the first RF resource, information identifying radio access technologies supported by each of the first and second RF resources, information identifying radio access technologies and frequency bands enabled by the first SIM, a number of entries in a neighbor cell list, and channel conditions of a serving cell.

In some embodiment systems, methods and devices, at least one parallel task assigned to each of the first and second RF resources may include one of an evaluation of intra-frequency cells, an evaluation of inter-frequency cells, and an evaluation of inter-radio access technology (RAT) cells, in which simultaneously performing the assigned parallelism tasks decreases time required to complete an evaluation of all neighbor cells.

In some embodiment systems, methods and devices, the at least one parallel task assigned to the first RF resource may include decoding a paging channel of a serving cell, and the at least one parallel task assigned to the second RF resource may include reading system information of a target cell during reselection. Embodiment methods may also include determining whether the first SIM has received a paging message in the serving cell, and stopping the reselection to the target cell in response to determining that the first SIM has received a paging message in the serving cell.

Embodiment methods may also include identifying each RF resource for which the at least one assigned parallel task includes at least one of an inter-frequency cell evaluation and an inter-RAT cell evaluation, identifying a set of neighbor cell frequencies for evaluation by each identified RF resource, identifying, for each set of neighbor cell frequencies, an associated frequency bin set, and, for each frequency in the set of neighbor cell frequencies, assigning a first frequency offset in the bin set to a first receive chain of the identified RF resource, and alternating assignment of the remaining frequency offsets between the first receive chain and a second receive chain of the identified RF resource.

In some embodiment systems, methods and devices, selecting the best parallelism task combination set may include determining whether at least one possible parallelism task combination set is identified, determining whether multiple possible parallelism task combination sets are identified in response to determining that at least one possible parallelism task combination set is identified, and comparing power usage savings that would result from implementing each of the possible parallelism task combination sets in response to determining that multiple possible parallelism task combination sets are identified. In some embodiment systems, methods and devices, selecting the best parallelism task combination set may also include comparing performance gains that would result from implementing each of the possible parallelism task combination sets in response to determining that multiple possible parallelism task combination sets are identified.

In some embodiment systems, methods and devices, the power usage savings that would result from implementing each of the possible parallelism task combination sets may be based on a reduction in time required to complete actions performed in parallel by the first and second RF resources from time period required to complete the actions performed in sequence by the first RF resource. Embodiment methods may also include performing the at least one identified idle-mode task on the first RF resource in response to determining that at least one possible parallelism task combination set is not identified. Embodiment methods may also include determining whether an initial cell selection process is required on the first RF resource in response to determining that the first RF resource is not idle mode, and, in response to determining that an initial cell selection process is required on the first RF resource, identifying a group of channels above a threshold signal strength, in which the group of channels are searched as potential carrier frequencies.

Embodiment methods may also include identifying a frequency bin set associated with the group of channels, and, for each channel in the identified group of channels, assigning a first frequency offset in the associated bin set to a first receive chain of the first RF resource, alternating assignment of remaining frequency offsets between the first receive chain and a second receive chain of the first RF resource; and determining whether the channel is a carrier frequency by tuning to an adjusted frequency associated with each assigned offset using the associated first or second receive chain.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
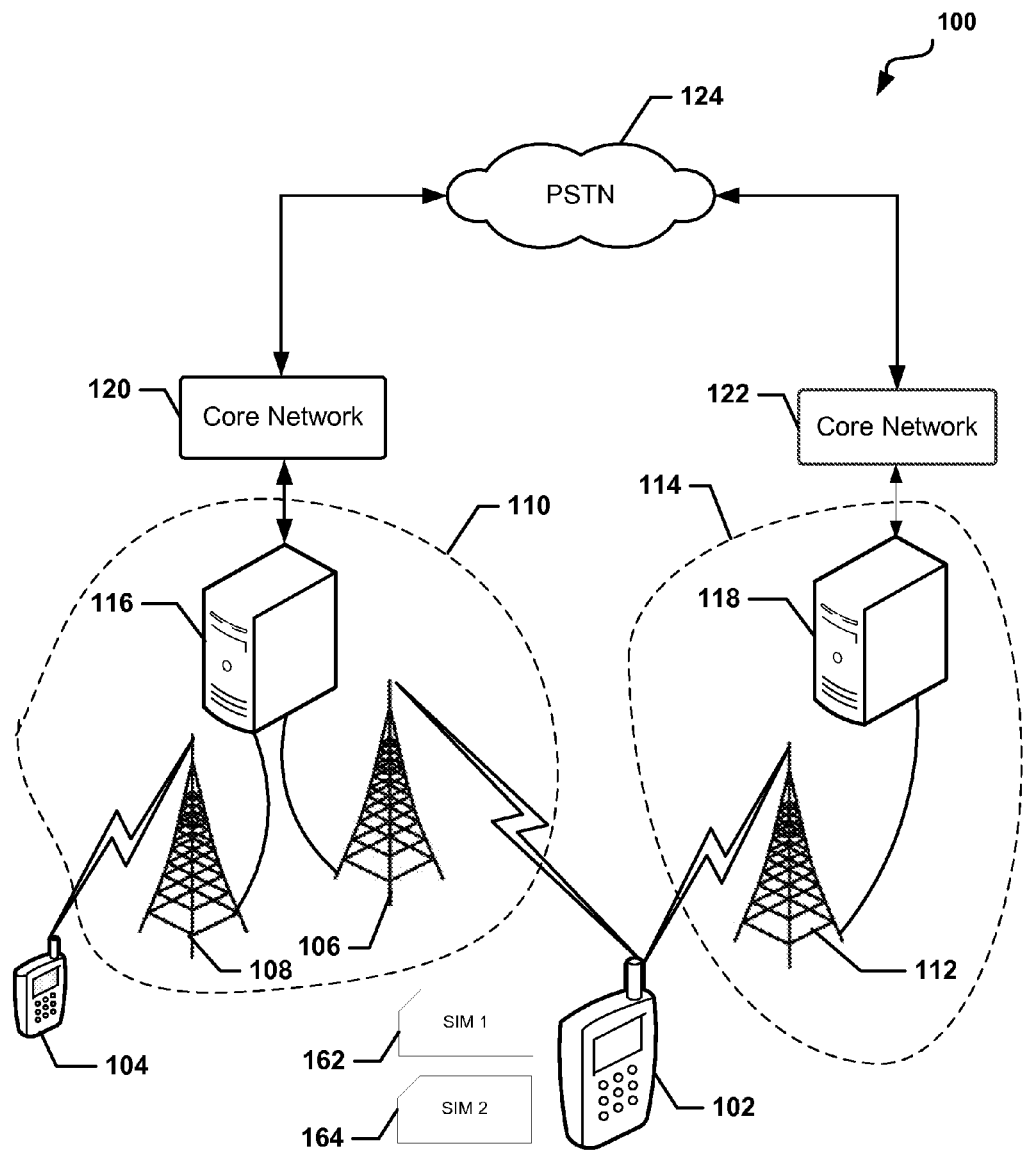
FIG. 1 is a communication system block diagram of a network suitable for use with various embodiments.

Various embodiments will be described in detail with reference to the accompanying drawings. Wherever possible the same reference numbers will be used throughout the drawings to refer to the same or like parts. References made to particular examples and implementations are for illustrative purposes, and are not intended to limit the scope of the invention or the claims.

The various embodiments enable improvements to efficiency and performance of idle-mode processes on a multi-SIM multi-active (MSMA) device, such as a DSDA device operating in single-SIM or DSDS mode by implementing parallel use of the RF resources for idle-mode tasks. Idle-mode tasks scheduled for a present or future idle mode wakeup period associated with a first SIM and corresponding first RF resource may be assigned to the second RF resource by a parallelism scheduling module, shortening the timeline for total idle-mode processes associated with the first SIM.

The terms "wireless device" and "wireless communication device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

As used herein, the terms "SIM," "SIM card," and "subscriber identification module" are used interchangeably to mean a memory that may be an integrated circuit or embedded into a removable card, which stores an International Mobile Subscriber Identity (IMSI), related key, and/or other information used to identify and/or authenticate a wireless device on a network. The term SIM may also be used as shorthand reference to a communication network associated with a particular SIM, since the information stored in a SIM enables the wireless device to establish a communication link with a particular network, thus the SIM and the communication network, as well as the services and subscriptions supported by that network, correlate to one another.

As used herein, the terms "multi-SIM wireless communication device," "multi-SIM wireless device," "dual-SIM wireless communication device," "dual-SIM-dual-active device," and "DSDA device" are used interchangeably to describe a wireless device that is configured with more than one SIM and is capable of independently handling communications with networks of all subscriptions.

As used herein, the terms "wireless network," "cellular network," "system," "public land mobile network," and "PLMN" are used interchangeably to describe a wireless network of a carrier associated with a wireless device and/or subscription on a wireless device, and/or its roaming partners.

As used herein, the terms "cell," "carrier," "channel," "cell frequency," "carrier frequency," "frequency channel," and "channel" are used interchangeably to describe a base frequency signal that a network broadcasts from a base transceiver station (BTS), radio base station (RBS), or node B in order to advertise its presence, operator identity, and other necessary initial information.

As used herein, the terms "diversity," "receive diversity," "diversity reception," and "receiver diversity" are used interchangeably to refer to processing a downlink/forward link signal by input to multiple receive chains in a wireless communication device. For example, at least two antennas provide at least two different inputs signals to a receiver, each of which has a slightly different multi-path environment.

As used herein, the terms "power-saving mode," "power-saving-mode cycle," "discontinuous reception," and "DRX cycle" are used interchangeably to refer to an idle-mode process that involves alternating sleep periods (during which power consumption is minimized) and awake (or "wake-up") periods (in which normal power consumption and reception are returned and the wireless device monitors a channel by normal reception). The length of a power-saving-mode cycle, measured as the interval between the start of a wake-up period and the start of the next wake-up period, is typically signaled by the network.

Wireless communication networks are widely deployed to provide various communication services such as voice, packet data, broadcast, messaging, and so on. These wireless networks may be capable of supporting communication for multiple users by sharing the available network resources. Examples of such wireless networks include Global System for Mobile Communications (GSM), Code Division Multiple Access (CDMA) networks, Time Division Multiple Access (TDMA) networks, and Frequency Division Multiple Access (FDMA) networks. These wireless networks may also utilize various radio technologies such as Wideband-CDMA (W-CDMA), cdma2000, Global System for Mobile Communications (GSM), etc.

In current mobile communications, wireless service carriers have standardized a number of techniques for selecting wireless communications systems and obtaining service therefrom, in accordance with preferences of the subscriber's service provider/carrier. Service providers generally enable subscribers to access a network by providing provisioning information to subscriber devices. For clarity, the embodiments are described below for GSM-type and/or UMTS-type networks, but may be applied to networks using any other radio technology or protocol.

A public land mobile network (PLMN) is communications network that is established by a wireless service carrier/service provider to provide land communication services to the public. When there are several PLMNs deployed in the same region, the areas covered by their networks may overlap. In typical wireless communications, a PLMN may operate on one or multiple frequency bands, and each wireless network within a PLMN may operate on one or more specific RF channels within a specific frequency band. Each RF channel is generally identified by a unique number, for example, an absolute radio-frequency channel number (ARFCN) in a GSM PLMN, or a UTRA ARFCN (UARFCN) in a UMTS PLMN. A PLMN may include cells that use one or many different multiple-access wireless communications protocols such as code division multiple access (CDMA), wideband CDMA (WCDMA), Advanced Mobile Phone Service (AMPS), Global System for Mobile communications (GSM), General Packet Radio Services (GPRS) or High Data Rate (HDR) technology.

An example GSM network may operate on any of a number of GSM bands (e.g., GSM 900, GSM 850, etc.), each of which cover multiple radio-frequency (RF) channels identified by ARFCNs. The ARFCNs for various GSM bands are given in 3GPP TS 05.05, entitled "Digital cellular telecommunications system (Phase 2+); Radio transmission and reception (Release 1999)." Further, each GSM network typically operates on a specific set of RF channels in a specific GSM band. In describing various embodiments, the terms "channel," "frequency," and "ARFCN" may be used interchangeably and may refer to channels in GSM bands, and/or channels in other network bands (i.e., UARFCNs for UMTS networks, etc.).

A multi-SIM wireless device that supports two or more SIM cards may have a number of capabilities that provide convenience to a user, such as allowing different wireless carriers, plans, telephone numbers, billing accounts, etc. on one device. Developments in multi-SIM wireless communication device technology have led to a variety of different options for such devices. For example, an "active dual-SIM" wireless device allows two SIMs to remain active and accessible to the device. In particular, a type of active dual-SIM wireless communication device may be a "dual-SIM-dual-active" (DSDA) wireless device in which two SIMs are configured to use separate transceivers (i.e., RF resources). Thus, in a DSDA device the SIMs may simultaneously operate in any of a variety of modes, such as active/connected mode (i.e., transmitting and/or receiving data), idle mode, etc. Other multi-SIM wireless communication devices may be configured to operate more than two SIMs in simultaneous active connections, such as by providing a separate transceiver for each of at least three SIMs.

The SIMs in a multi-SIM wireless communication device may be associated with the same or different PLMNs, each of which may have more than one wireless network. Each SIM is generally provisioned by a service provider with a list of preferred PLMNs from which the wireless communication device can receive service (i.e., a home PLMN and roaming partner PLMNs). In some embodiments, the wireless device processor may access non-volatile memory associated with a given one of the SIMs to identify supported radio access technologies, and the corresponding enabled frequency bands (and ARFCNs/UARFCNs/channels in each band).

Although multi-SIM wireless communication devices offer a variety of options to the end user, they also necessitate efficient execution of complex tasks. In multi-SIM resource management, multiple SIMs may generally be handled separately with respect to out-of-service recovery and power-up scenarios. In particular, DSDA devices generally have separate modem stacks to operate using their respective RF resources.

In operation, once powered on and/or recovering from an out-of-service condition, a conventional wireless device (or modem stack associated with a SIM of a conventional multi-SIM wireless device) may begin an initial cell selection procedure if no information about the current wireless environment is stored in the wireless device. Otherwise, the wireless device typically starts a cell selection using a stored information cell-selection procedure. The wireless device may have stored the necessary information of the cell the wireless device was previously camped on, such as frequency and scrambling code. Generally, the wireless device may first try to synchronize with that previous cell, and if synchronization fails, the wireless communication device may trigger the initial cell selection.

A conventional wireless device may first attempt to find PLMNs for one or more radio access technology (e.g., GSM, UMTS, etc.). To find PLMNs, the wireless device may perform a power scan on enabled frequency bands supported by the radio access technology to identify channels and measure signal strength for identified channels. The wireless device may identify those channels that are above a threshold signal strength (e.g., a received signal strength indication (RSSI) of at least −85 dBm in GSM systems) and may attempt acquisition of each identified strong channel. Acquisition of a GSM channel may involve detecting a carrier frequency by receiving control channel information on the identified strong channel in a GSM band. Receiving such control information is typically accomplished in GSM systems by detecting a tone on a Frequency Correction Channel (FCCH). Acquisition of a UMTS channel may involve detecting a carrier frequency by searching for a primary synchronization code (PSC) sequence sent on a primary synchronization channel (SCH) for an identified strong channel, such as by correlating received samples with a locally generated PSC sequence at different time offsets. Alternatively, the wireless device may use a list of stored carrier frequency information from previously received measurement and control information. In UMTS systems, such information includes scrambling code.

For each detected carrier frequency (i.e., acquired cell), the wireless device typically tunes to the frequency to read information to identify the associated network. For example, in GSM systems, the wireless device may read a Synchronization Channel (SCH) to obtain a base station identity code (BSIC), followed by reading the BCCH to obtain system information (e.g., a PLMN identifier). In UMTS systems, the wireless device typically correlates the signal of the detected carrier frequency (i.e., acquired cell) to possible secondary synchronization codes to determine the correct code and obtain the frame synchronization on the corresponding secondary synchronization channel (S-SCH) and group identity, finding the correct scrambling code, and detecting the common control physical channel (CCPCH), which carries the system information including PLMN. In this manner, the wireless device may identify acquired cells in its vicinity.

A conventional wireless device may select one of the PLMNs from those identified according to one of at least two modes. In automatic mode, the wireless device may automatically choose a PLMN based on the preferred PLMN list, which may be specified by the manufacturer and/or home PLMN operator. In manual mode, the wireless device may be configured to present to the user a list containing all identified PLMNs, from which the user may select a desired PLMN. Once a PLMN has been selected, the wireless device may read system information of each acquired cell to obtain parameters, for example, the PLMN identity and cell selection parameters.

The wireless device may select one of the cells that belongs to the selected PLMN. If multiple cells belong to the selected PLMN, the wireless device may employ any of a number of criteria to choose a cell on which to camp. For example, the wireless device may calculate a cell selection value based on the quality of the cell signal (dB/dBm), and the difference between the minimum required quality level in the cell and the maximum transmit power level allowed for the wireless device in the cell, both of which are typically read from values in system information.

While camped on a given cell, the wireless device may monitor signals from neighboring cells as well as current conditions in the serving cell. Processes for monitoring/evaluating neighbor cells are typically always active, when the wireless device is in idle mode, following initial cell selection (i.e., acquisition and camping). If a change to a different cell is indicated, such as because the signal from one of the neighboring cells is stronger than that of the current cell or because of network conditions and priorities, a cell reselection process to a target cell is invoked, followed by location update as required. The neighbor cells may use the same radio access technology (RAT) as that of the serving cell (e.g., GSM) or a different RAT (e.g., UMTS/WCDMA). For example, each GSM cell that supports Release 99 or a later version of the GSM standard, and each 3GPP cell, typically broadcasts a neighbor cell list that may contain up to 32 GSM cells and up to 64 WCDMA neighbor cells distributed across up to three WCDMA frequencies. For the GSM cells, the neighbor cell list contains the ARFCN of the BCCH carrier and the BSIC. For cells using other technologies, such as WCDMA, additional information (e.g., a primary scrambling code) may be included in order to enable the device to determine quality of the cell.

Based on the neighbor cell list, a conventional wireless device may calculate the received-chip-energy-to-noise ratio or signal strength, and/or other quality measurements to determine whether a better cell exists. In some systems, this involves calculating a cell selection value based on the minimum required quality in the cell and the maximum transmission power, which are read from system information (i.e., cell selection parameters). If a better neighbor cell is identified, the wireless device checks to ensure no restrictions exist to choosing the new/target cell, which information may be read in a part of the system information of the target cell. If no restrictions exist, the wireless device tunes to the new cell and reads complete system information in the new cell.

In a conventional system, the wireless device may change between cells using the same frequency (intra-frequency handover) or between cells using different frequencies (inter-frequency handover). The network of the serving cell may direct the wireless device to perform intra-frequency measurements of cells of the neighbor cell list, which might be reported to the network to permit evaluation of the quality of the respective cells and, if appropriate, trigger an intra-frequency handover event. Similarly, the network may direct the wireless device to perform inter-frequency measurements of each frequency of the neighbor cell list, which may also be reported to the serving cell network to permit evaluation of the quality of the respective frequencies and, if appropriate, trigger an inter-frequency handover event.

Thus, in order to perform reselection/handover to an inter-frequency or inter-RAT cell (i.e., a target cell), a conventional wireless device may need to tune its RF receiver to the target cell in order to receive system information as part of the handover. While tuned away, the wireless device is generally unable to receive data (e.g., incoming paging messages) from the serving cell network, thereby requiring the wireless device to either immediately stop reselection if a page is received or to ignore the incoming paging message. Both of these options, however, typically cause a loss of performance.

Additionally, in order to tune to different channels for cell acquisition in certain radio access technologies (e.g., UMTS) a conventional wireless device may anticipate non-ideal channel conditions by implementing frequency binning. That is, the wireless device may account for a slight difference between the frequency that the wireless device is tuned to and the frequency at which the network is transmitting (e.g., due to frequency error in oscillator, temperature, interference, etc.) by employing different frequency offsets (or bins) around a channel frequency. However, the range of frequency binning may vary due to additional factors (e.g., temperature, interference, old receiver hardware, imprecision at network base station, etc.).

In various embodiments, efficiency and performance of idle mode processes on a DSDA device operating in single-SIM or DSDS mode may be improved by implementing parallel use of the RF resources for idle-mode tasks. In various embodiments, idle-mode tasks scheduled for a present or future idle mode wakeup period associated with a first SIM and corresponding first RF resource may be instead assigned to the second RF resource. In this manner, the normal timeline for total idle mode processes associated with the first SIM may be compressed. The allocation of the portion of idle-mode tasks to the second RF resource may be controlled by a parallelism scheduling module.

In some embodiments, the parallelism scheduling module may be configured to use various parameters in selecting one or more activities to assign to the second RF resource. In some embodiments, the parallelism scheduling module may be configured to access a list or look-up table that identifies permissible task combinations for idle-mode parallel performance, and to select a combination based on the parameters. Further, in various embodiments, efficiency of certain idle mode processes may be improved by implementing parallel use of the associated primary and secondary receive chains to decrease search time for carrier frequency acquisition on either or both of the first and second RF resources.

FIG. 1 illustrates a wireless network system 100 suitable for use with various embodiments. A first wireless device 102 and a second wireless device 104 may each be configured to establish wireless connections with cell towers or base stations of one or more radio access networks. For example, the wireless devices 102, 104 may transmit/receive data using a first base station 106 and a second base station 108, each of which may be part of a first network 110, as is known in the art. The first wireless device 102 may further be configured to transmit/receive data through a third base station 112, which may be part of a second network 114.

The networks 110, 114 may be cellular data networks, and may use channel access methods including, but not limited to, Frequency Division Multiple Access (FDMA), Time Division Multiple Access (TDMA), Code Division Multiple Access (CDMA), Universal Mobile Telecommunications Systems (UMTS) (particularly, Long Term Evolution (LTE)), Global System for Mobile Communications (GSM), Wi-Fi, PCS, or other protocols that may be used in a wireless communications network or a data communications network. The networks 110, 114 may use the same or different wireless interfaces and/or physical layers. In some embodiments, the base stations 106, 108, 112 may be controlled by one or more base station controllers (BSC) (e.g., a first BSC 116 and a second BSC 118). For example, the base stations 106, 108, the first BSC 116, and other components may form the first network 110, as is known in the art. Alternate network configurations may also be used and the embodiments are not limited to the configuration illustrated. For example, in another embodiment the functionality of the first BSC 116 and at least one of the base stations 106, 108 may be collapsed into a single "hybrid" module having the functionality of these components.

In various embodiments, the first wireless device 102 may simultaneously access multiple core networks (e.g., a first core network 120 and a second core network 122) after camping on cells managed by the base stations 106, 112. The first wireless device 102 may also establish connections with Wi-Fi access points (not shown), which may connect to the Internet. While various embodiments are particularly useful with wireless networks, the embodiments are not limited to wireless networks and may be implemented over wired networks with no changes to the methods.

In the wireless network system 100, the first wireless device 102 may be a multi-SIM wireless communication device that is capable of operating on a plurality of SIMs (e.g., a first SIM 162 and a second SIM 164). For example, the first wireless device 102 may be a dual-SIM wireless communication device. Using dual-SIM functionality, the first wireless device 102 may simultaneously access each of the core networks 120, 122 by camping on cells managed by the base stations 106, 112. The core networks 120, 122 may be interconnected by a public switched telephone network (PSTN) 124, across which the core networks 120, 122 may route various incoming and outgoing communications to the first wireless device 102.

The first wireless device 102 may make a voice or data call to a third party device, such as the second wireless device 104, using one of the SIMs 162, 164. The first wireless device 102 may also receive a voice call or other data transmission from a third party. The third party device (e.g., the second wireless device 104) may be any of a variety of devices, including, but not limited to, a mobile phone, laptop computer, PDA, server, etc.

Some or all of the wireless devices 102, 104 may be configured with multi-mode capabilities and may include multiple transceivers for communicating with different wireless networks over different wireless links/RATs. For example, the first wireless device 102 may be configured to communicate over multiple wireless data networks on different subscriptions, such as in a dual-SIM wireless device. In particular, the first wireless device 102 may be configured with dual-SIM-dual-active (DSDA) capabilities, which may enable the first wireless device 102 to simultaneously participate in two independent communications sessions, generally though independent transmit/receive chains.

For clarity, while the techniques and embodiments described herein relate to a wireless device configured with at least one GSM subscription, they may be extended to subscriptions on other radio access networks (e.g., UMTS/WCDMA, LTE, CDMA, etc.).

Figure 2:
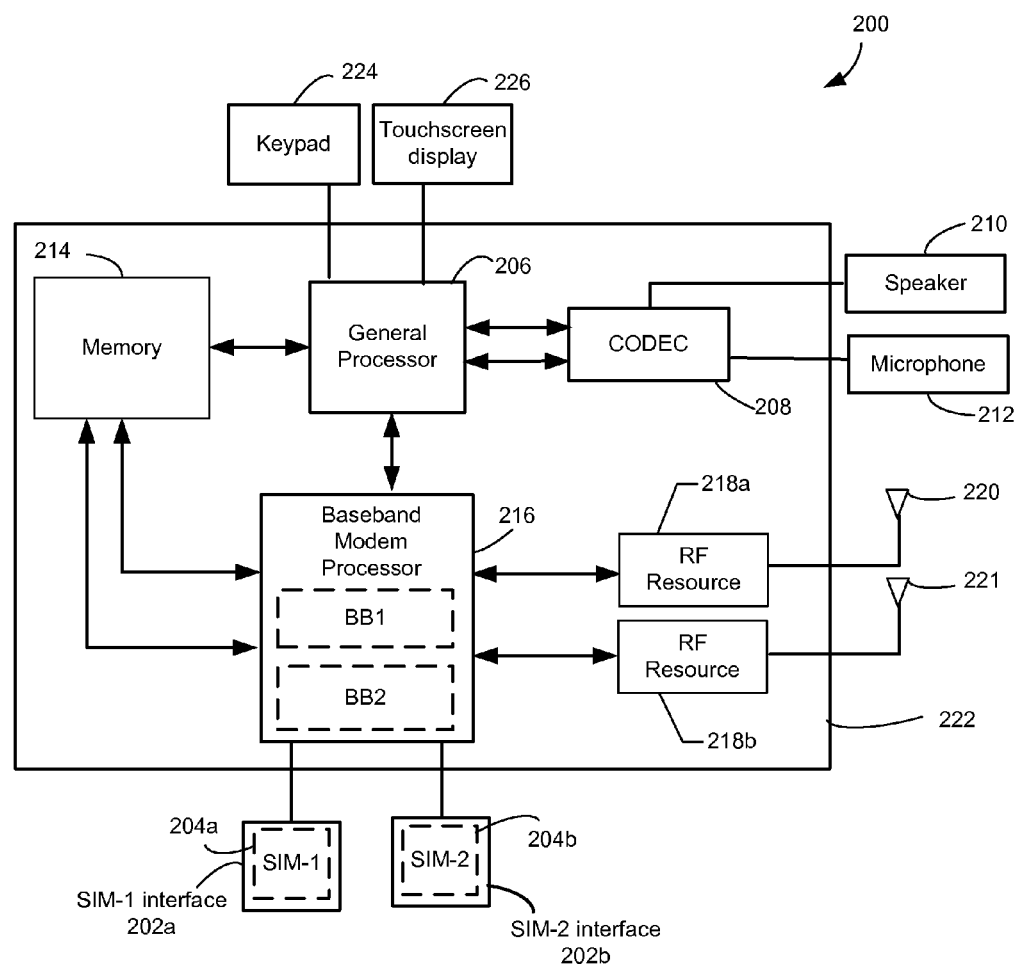
FIG. 2 is a block diagram illustrating a dual-SIM-dual-active wireless communication device according to various embodiments.

FIG. 2 is a functional block diagram of a wireless device 200 suitable for implementing various embodiments. According to various embodiments, the wireless device 200 may be similar to one or more of the wireless devices 102, 104 as described above with reference to FIG. 1. With reference to FIGS. 1-2, the wireless device 200 may include a first SIM interface 202a, which may receive a first SIM 204a that is associated with a first subscription. The wireless device 200 may also include a second SIM interface 202b, which may receive a second SIM 204b that is associated with a second subscription.

A SIM in various embodiments may be a Universal Integrated Circuit Card (UICC) that is configured with SIM and/or USIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each of the SIM 204a, 204b may have a CPU, ROM, RAM, EEPROM and I/O circuits. One or more of the SIMs 204a, 204b used in various embodiments may contain user account information, an IMSI a set of SIM application toolkit (SAT) commands and storage space for phone book contacts. One or more of the SIMs 204a, 204b may further store home identifiers (e.g., a System Identification Number (SID)/Network Identification Number (NID) pair, a Home PLMN (HPLMN) code, etc.) to indicate the SIM network operator provider. An Integrated Circuit Card Identity (ICCID) SIM serial number may be printed on one or more of the SIMs 204a, 204b for identification. However, a SIM may be implemented within a portion of memory of the wireless device 200 (e.g., memory 214), and thus need not be a separate or removable circuit, chip or card.

The wireless device 200 may include at least one controller, such as a general purpose processor 206, which may be coupled to a coder/decoder (CODEC) 208. The CODEC 208 may in turn be coupled to a speaker 210 and a microphone 212. The general purpose processor 206 may also be coupled to the memory 214.

The memory 214 may be a non-transitory tangible computer readable storage medium that stores processor-executable instructions. For example, the instructions may include routing communication data relating to the first or second subscription though a corresponding baseband-RF resource chain. The memory 214 may store operating system (OS), as well as user application software and executable instructions. The memory 214 may also store application data, such as an array data structure.

The general purpose processor 206 and memory 214 may each be coupled to at least one baseband modem processor 216. Each of the SIMs 204a, 204b in the wireless device 200 may be associated with a baseband-RF resource chain that may include the baseband modem processor 216—which may perform baseband/modem functions for communicating with/controlling a RAT—and one or more amplifiers and radios, referred to generally herein as RF resources (e.g., a first RF resource 218a and a second RF resource 218b). In some embodiments, baseband-RF resource chains may share the baseband modem processor 216 (i.e., a single device that performs baseband/modem functions for all SIMs on the wireless device 200). In other embodiments, each baseband-RF resource chain may include physically or logically separate baseband processors (e.g., BB1, BB2).

The RF resources 218a, 218b may each be coupled to a wireless antenna (e.g., a first wireless antenna 220 and a second wireless antenna 221), and may perform transmit/receive functions for the wireless services associated with each of the SIM 204a, 204b of the wireless device 200. In some embodiments, the RF resources 218a, 218b may be coupled to the wireless antennas 220, 221 for sending and receiving RF signals for the SIMs 204a, 204b, thereby enabling the wireless device 200 to perform simultaneous communications with separate networks and/or services associated with the SIMs 204a, 204b. The RF resources 218a, 218b may provide separate transmit and receive functionality, or may include a transceiver that combines transmitter and receiver functions. In some embodiments, one or both of the wireless antennas 220, 221 may each represent a plurality of antennas associated with each RF resource 218a, 218b, such as to support diversity reception.

In some embodiments, the general purpose processor 206, the memory 214, the baseband modem processor(s) 216, and the RF resources 218a, 218b may be included in the wireless device 200 as a system-on-chip 222. In some embodiments, the first and second SIMs 204a, 204b and their corresponding interfaces 202a, 202b may be external to the system-on-chip 222. Further, various input and output devices may be coupled to components of the system-on-chip 222, such as interfaces or controllers. Example user input components suitable for use in the wireless device 200 may include, but are not limited to, a keypad 224 and a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in the wireless device 200 to enable communication between them, as is known in the art.

Functioning together, the two SIMs 204a, 204b, the baseband modem processor 216, the RF resources 218a, 218b, and the wireless antennas 220a, 220b may constitute two or more RATs. For example, a SIM, baseband processor, and RF resource may be configured to support two different radio access technologies, such as GSM and WCDMA. More RATs may be supported on the wireless device 200 by adding more SIM cards, SIM interfaces, RF resources, and/or antennae for connecting to additional mobile networks.

Various embodiment wireless devices may have more than one antenna and/or other receive chain components for performing receive functions in an RF resource. While specific embodiments may be described herein with reference to a degree of diversity of two, (i.e., two RF resources, two antennas, two RF receive chains, etc.), such references are used as example and are not meant to preclude embodiments using three or more RF resources to provide receive diversity. An RF resource may include one or more RF receive chain that may include, may include, without limitation, an RF front end, components of the RF front end (including a receiver unit), antennas, etc. Portions of the RF receive chain may be integrated into a single chip, or distributed over multiple chips. Also, a receive chain, or portions of the receive chain may be integrated into a chip along with other functions of the wireless device. The various embodiments may be used in wireless systems having two or more antennas and/or receive chains that make up the receive portion of at least one of the RF resources (i.e., one receiver plus one or more diversity receivers, in the wireless communication device for a given communication scheme).

Figure 3:
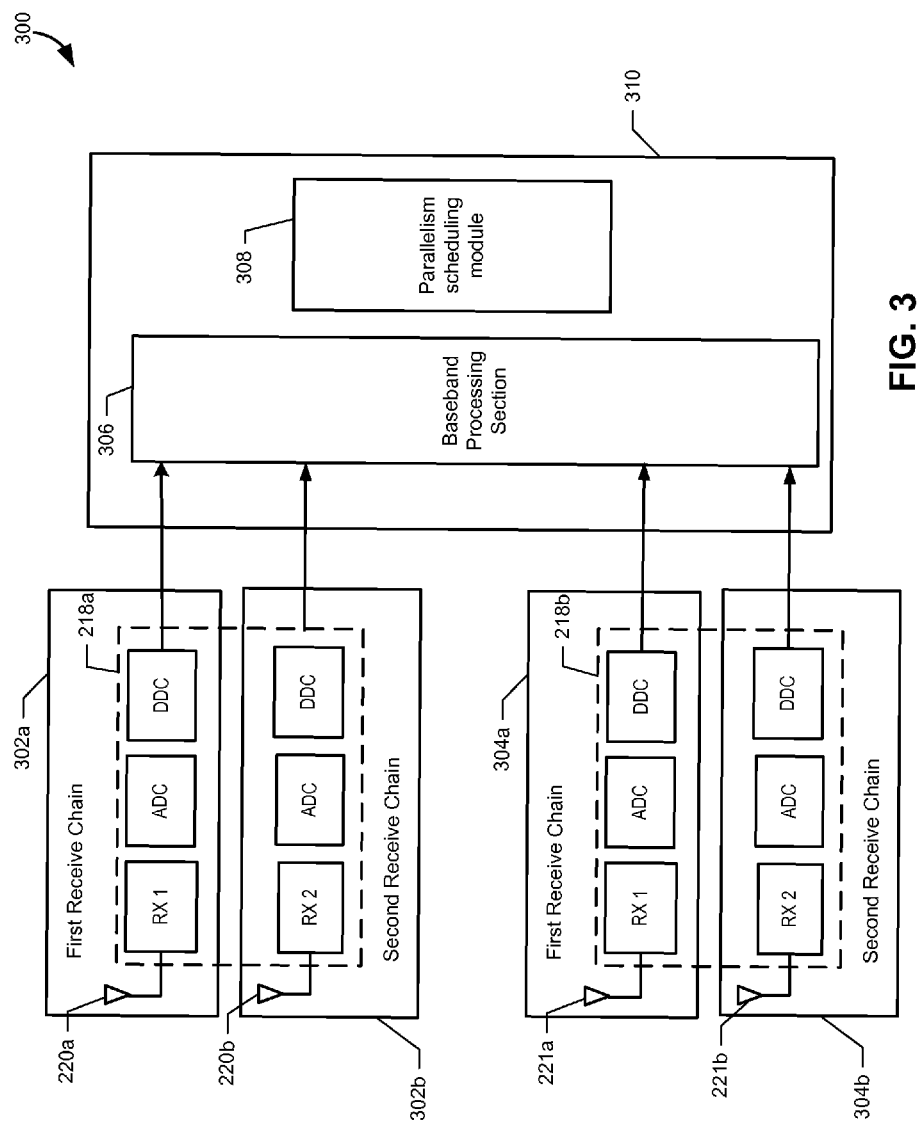
FIG. 3 is a block diagram illustrating an example configuration of receiving components associated with radio-frequency (RF) resources according to various embodiments.

FIG. 3 illustrates a configuration 300 of receive elements that may interact in a wireless device to provide capability according to various embodiments. Referring to FIGS. 1 and 2, such receive elements in the configuration 300 may be functions and/or components of the wireless device 200. With reference to FIGS. 1-3A, in the configuration 300, the first RF resource 218a may include components of a first receive chain 302a and of a second receive chain 302b. In some embodiments, the first receive chain 302a may include the first wireless antenna 220a and first RF frontend components, such as a receiver unit (RX 1), an analog to digital converter (ADC), and a digital down converter (DDC), the functions and details of which are known in the art of digital transceiver design. Similarly, the second receive chain 302b may include the second wireless antenna 220b and second RF frontend components, such as a receiver unit (RX 2), a second analog to digital converter (ADC), and a digital down converter (DDC). In some embodiments, the first RF frontend components and second RF frontend components of the respective first and second receive chains 302a, 302b may make up the first RF resource 218a.

Similar to the first RF resource 218a, the second RF resource 218b may include components of a first receive chain 304a and of a second receive chain 304b. In some embodiments, the first receive chain 304a may include a first wireless antenna 221a and first RF frontend components, such as a receiver unit (RX 1), an analog to digital converter (ADC), and a digital down converter (DDC), the functions and details of which are known in the art of digital transceiver design. Similarly, the second receive chain 304b may include a second wireless antenna 221b and second RF frontend components, such as a receiver unit (RX 2), a second analog to digital converter (ADC), and a digital down converter (DDC). In some embodiments, the first RF frontend components and second RF frontend components of the respective first and second receive chains 304a, 304b may make up the second RF resource 218b.

The baseband processing section 306 may represent functions of the baseband modem processor 216 associated with the first and second RF resources 218a, 218b, respectively. The baseband processing section 306 in various embodiments may include transmit functions, as well as additional receive functions, neither of which are shown. For example, transmit functions may include encoding, interleaving, and multiplexing at the symbol rate, and channelization, spreading, and modulation at the chip rate. The additional receive functions may include rake receiving, and symbol combining, and finger control at the chip rate, and demultiplexing, deinterleaving, and decoding at the symbol rate. A variety of other receive functions that are not shown may nevertheless be included in the first receive chain 302a, 304a and second receive chain 302b, 304b of each of the first and second RF resources 218a, 218b. The various designs of radio components may allow RF resources to be configured in any of a number of possible configurations. The specific tasks that may be assigned to the RF resources while the device is operating in single-SIM or DSDS mode may be controlled by a parallelism scheduling module 308, which may be logic associated with the general purpose processor 206, a software module executed by the general purpose processor 206, or integrated with the general purpose processor 206.

While the baseband processing section 306 and the parallelism scheduling module 308 may be discrete components, they may be integrated in a number of ways, either with one another or with other components of the wireless device. In a particular embodiment, some components, such as the baseband processing section 306 and the parallelism scheduling module 308 may be included in a system-on-chip device 310.

Separate units of a baseband-modem processor (e.g., 216) of a multi-SIM device (e.g., 200) may be implemented as separate structures or as separate logical units within the same structure, and may be configured to execute software including at least two protocol stacks/modem stacks associated with at least two SIMs, respectively. The SIMs and associated modem stacks may be configured to support a variety of communication services that fulfill different user requirements. Further, a particular SIM may be provisioned with information to execute different signaling procedures for accessing a domain of the core network associated with these services and for handling data thereof.

Separate units of the baseband-modem processor of the multi-SIM wireless device may be implemented as separate structures or as separate logical units within the same structure, and may be configured to execute software including at least two protocol/modem stacks associated with at least two SIMs, respectively. The SIMs and associated modem stacks may be configured to support a variety of communication services that fulfill different user requirements. Further, a particular SIM may be provisioned with information to execute different signaling procedures for accessing a domain of the core network associated with these services and for handling data thereof.

While described with respect to GSM and/or UMTS networks, these are merely examples of networks to which serving cells for associated with the modem stacks of various embodiments may belong.

In various embodiments in which a wireless device (e.g., 200) is configured with multiple SIMs each associated with an independent RF resource (e.g., a DSDA device), a variety of power consumption and performance improvements may be implemented when operating in a single-SIM- or multi-SIM-standby mode. In various embodiments, these improvements may be accomplished by parallel scheduling and simultaneous performance of idle-mode tasks. In some embodiments, to improve power consumption on the DSDA device, the RF resources may be used simultaneously to each search for and measure signals of one of intra-frequency neighbor cells, inter-frequency neighbor cells, and inter-RAT neighbor cells during an idle mode wake-up period. In some embodiments, to improve performance on the DSDA device, both RF resources may be used if reselection to an inter-frequency or inter-RAT target (i.e., neighbor) cell is triggered. For example, one RF resource may be assigned to decode pages on the frequency of the serving cell, while the other RF resource may be assigned to read the system information on the frequency of the target cell.

In some embodiments, improvements in power consumption and performance may involve the primary and diversity receive chains associated with one or more RF resources. In some embodiments, during the cell acquisition during initial cell selection, inter-frequency cell reselection, or inter-RAT cell reselection, parallel use of the primary and diversity receive chains may be implemented for one or both RF resources. For example, each receive chain may be simultaneously assigned to search a different frequency offset of the frequency bin set.

Once in idle mode, a SIM may implement a power saving mode that includes a cycle of sleep and awake states (e.g., discontinuous reception (DRX)). During the wake-up period (i.e., awake state), an RF resource associated with a modem stack in such power-saving mode may monitor paging channels/receive network pages (i.e., radio use), as well as monitor signals from neighbor cells (e.g., evaluate measurements indicative of signal quality). The modem stack may power off most processes and components, including the associated RF resource, during the sleep state. Due to various network conditions and configurations, the modem stack may be required to monitor a large number of neighbor cells, the time for which may be longer than the wake-up period. Therefore, the processes for monitoring neighbor cell signals may be distributed across multiple wake-up periods, thereby delaying their completion and resulting in additional power expenditures based, for example, on tuning to and away from different channels, transitioning into and out of the sleep state, etc.

Figure 4:
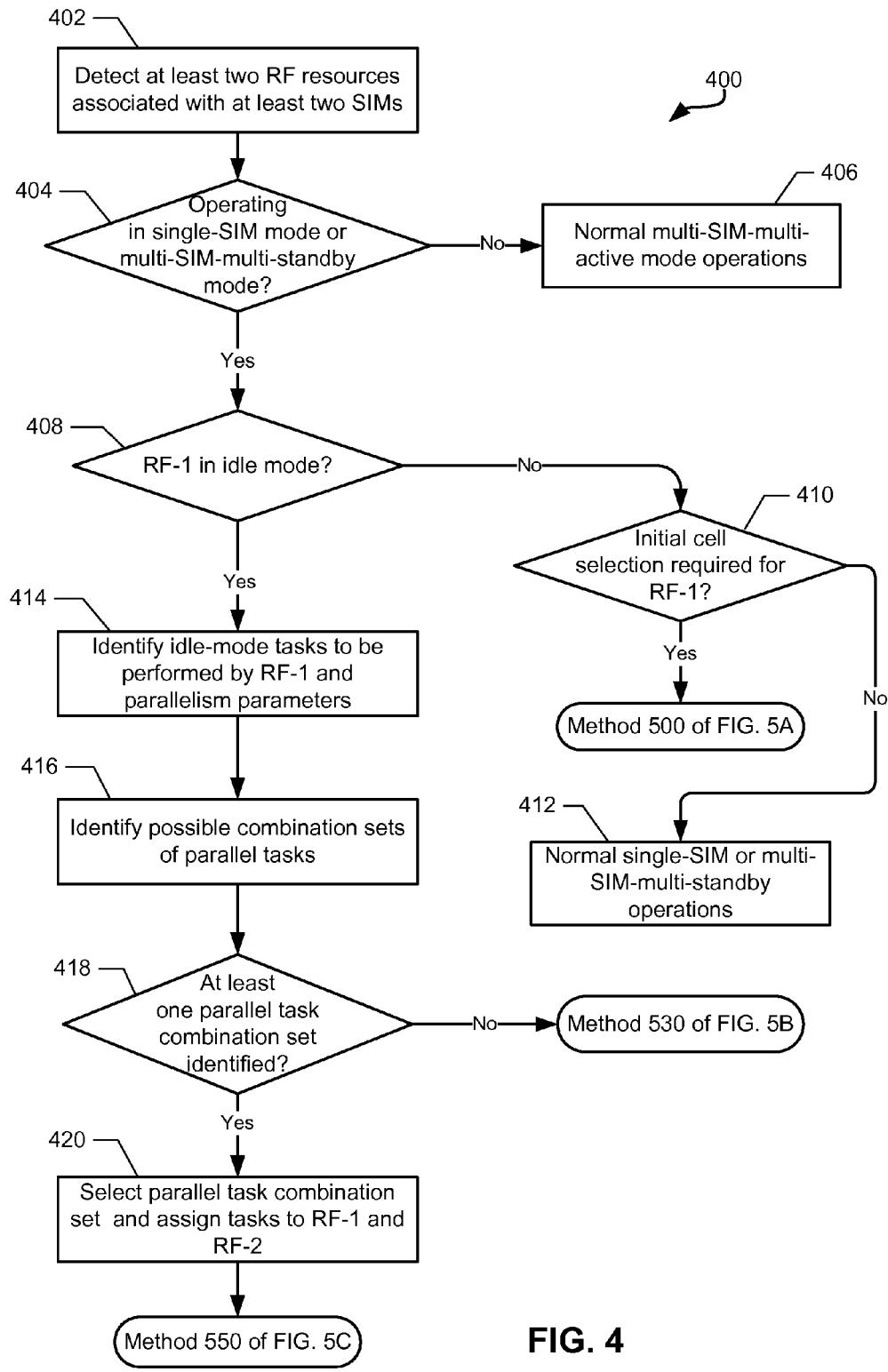
FIG. 4 is a process flow diagram illustrating a method for improving idle mode power usage and performance of an example dual-SIM wireless communication device according to various embodiments.

FIG. 4 illustrates a method 400 for improving efficiency and performance of idle-mode tasks on a multi-SIM-multi-active (e.g., DSDA) wireless device (e.g., 102, 200 in FIGS. 1-2) that is operating in a single-SIM or a multi-SIM-multi-standby (e.g., DSDS) mode according to some embodiments. In various embodiments, the operations of the method 400 may be implemented by one or more processors of the wireless device, such as the general purpose processor 206 in FIG. 2 and/or baseband modem processor(s) 216, or a separate controller (not shown) that may be coupled to memory (e.g., 214) and to the baseband modem processor(s) 216.

With reference to FIGS. 1-4, in block 402, the wireless device processor may detect that the wireless device is configured with at least two RF resources (e.g., 218a, 218b) that are respectively associated with at least two SIMs (e.g., a DSDA configuration). In determination block 404, the wireless device processor may determine whether the wireless device is currently operating in either a single-SIM mode or a multi-SIM-multi-standby (MSMS) mode, such as operating in a dual-SIM-dual-standby (DSDS) mode. In response to determining that the wireless device is not currently operating in either a single-SIM mode or an MSMS mode (i.e., determination block 404="No"), the wireless device may continue normal multi-SIM-multi-active mode operations (e.g., dual-SIM-dual-active operations) in block 406. In response to determining that the wireless device is currently operating in either a single-SIM mode or an MSMS mode (i.e., determination block 404="Yes"), the wireless device processor may determine whether the first RF resource ("RF-1") is in idle mode in determination block 408.

References herein to the first RF resource or RF-1 and the second RF resource or RF-2 are arbitrary and for ease of description and reference purposes only, as the wireless device processor may assign any indicator, name or other designation to differentiate the RF resources based on which SIM is enabled if operating in a single-SIM mode, or based on which RF resource is being shared if operating in a DSDS mode. Similarly, references herein to the first SIM or SIM-1 and the second SIM or SIM-2 are arbitrary and for ease of description and reference purposes only, as the wireless device processor may assign any indicator, name or other designation to differentiate the SIMs associated with the respective first and second RF resources.

In response to determining that the first RF resource is not in idle mode (i.e., determination block 408="No"), the wireless device processor may determine whether initial cell selection is required on the first RF resource in determination block 410. For example, the wireless device may have been recently powered on or may be recovering from an out-of-service condition, and may be attempting to acquire service from a network in which it can camp. In response to determining that initial cell selection is required on the first RF resource (i.e., determination block 410="Yes"), the wireless device processor may perform operations in method 500 (see, e.g., FIG. 5A). In response to determining that initial cell selection is not required on the first RF resource (i.e., determination block 410="No"), the first RF resource may perform normal single-SIM or multi-SIM-multi-standby (e.g., DSDS) operations in block 412. For example, the first RF resource may be active or connected mode, and therefore participating in a communication session for the SIM associated with the first RF resource (i.e., first SIM).

In response to determining that the first RF resource is in idle mode (i.e., determination block 408="Yes"), in block 414, the wireless device processor may identify an idle-mode task or tasks to be performed by the first RF resource, as well as parameters that may influence the suitability of and/or efficiency gained from scheduling various combinations of idle-mode tasks for simultaneous performance ("parallelism parameters"). In some embodiments, the identified idle-mode tasks may be all idle-mode tasks that are scheduled for the first RF resource during the next wake-up period of the power saving mode cycle (e.g., a DRX cycle). In some embodiments, the identified idle-mode tasks may be only the next idle-mode task scheduled. In some embodiments, the identified idle-mode tasks may be those scheduled for the first RF resource over multiple (e.g., the next three, five, etc.) wake-up cycles.

Examples of idle-mode tasks that may be scheduled for wakeup periods on the first RF resource may include, but are not limited to, decoding a paging channel of the serving cell, evaluating channel conditions of the serving cell, and evaluating channel conditions of the neighbor cells. For example, during one wakeup period the first RF resource may decode the paging channel, as well as evaluate channel conditions of a first group of neighbor cells, such as some or all of the intra-frequency, inter-frequency, or inter-RAT cells. As discussed, evaluating the channel conditions of a UMTS neighbor cell may involve measurement of its signal noise ratio, signal interference ratio (SIR), received signal code power (RSCP), and/or path loss, while evaluating the channel conditions of a GSM neighbor cell may involve measurement of the received signal strength indication (RSSI).

Another example idle-mode task that may be performed on the first RF resource may be a reselection process that is triggered, for example, based on identifying a better quality neighbor cell. In some embodiments, a better quality neighbor cell may be identified based on channel conditions of the serving cell, measurements from evaluating the neighbor cells, and offset value and hysteresis associated with the serving cell. To perform reselection to the better quality neighbor cell (i.e., target cell) the wireless device may read a portion of its system information during the wakeup period to obtain information for calculating a cell selection value of the target cell.

The parallelism parameters in the various embodiments include properties and settings of the wireless device and/or the network that assist in determining how to schedule idle-mode tasks given the idle-mode tasks scheduled to be performed on the first RF resource. An example parallelism parameters may include the duration of the wake-up period of the power saving mode cycle associated with the first RF resource (e.g., 50 ms, 60 ms, etc.). In some embodiments, the wake-up period duration may be a controlled by the network to which the first RF resource is connected (i.e., network of the serving cell). Another parallelism parameter may include the RATs and frequency bands of those RATs that are supported by the SIM associated with the first RF resource (e.g., SIM-1). Another parallelism parameter may include a history of the recent idle-mode tasks performed by the first RF resource. For example, in some embodiments the first SIM and/or first RF resource may be configured such that neighbor cell evaluation is performed for inter-frequency and/or inter-RAT cells only after evaluating all intra-frequency neighbor cells, or determining that an insufficient number of intra-frequency neighbor cells are found.

Based on the identified idle-mode tasks for RF-1 and the identified parallelism parameters, in block 416, the wireless device processor may identify the possible combination sets of parallel tasks that may be performed by the first and second RF resources if the second RF resource is powered up for the wake-up periods associated with the first RF resource. In some embodiments, the identified idle-mode tasks for the first RF resource and the parallelism parameters may be input into a parallelism scheduling module (e.g., 308), which may be a rule engine that implements one or more algorithm to determine the possible parallel task combination sets. In some embodiments, such combinations may be predefined and stored in an array, matrix or other data structure, which may be accessed by the wireless device processor. For example, the wireless device processor may use the identified idle-mode tasks for the first RF resource and/or one or more of the parallelism parameters as look-up indices to locate a memory address in which zero, one, or multiple parallel task combination sets may be stored.

In an example use case, the identified idle-mode tasks for the first RF resource may include decoding a paging indicator channel, which may take around 9 ms, performing an evaluation of intra-frequency neighbor cells, and performing an evaluation of inter-frequency neighbor cells. With respect to parallelism parameters, the duration of each of the cell evaluation procedures may depend on the number cells identified in the neighbor cell list. The duration of each wake-up period between sleep cycles in a power saving mode of the first RF resource may be 60 ms. The serving cell network may be configured such that the first RF resource decodes the PICH one time per wake-up cycle, and the first SIM and/or first RF resource may be configured to complete the evaluation of intra-frequency neighbor cells before using the first RF resource to evaluate inter-frequency neighbor cells.

Therefore, using a parallelism scheduling module to run an algorithm or to access a predetermined matrix, the wireless device processor may identify a possible parallel task combination set as being a PICH decode followed by intra-frequency cell evaluation for performance by one RF resource, and inter-frequency cell evaluation for performance by another RF resource.

In another example use case, the identified idle-mode tasks for the first RF resource and the second RF resource may include decoding the PICH and decoding system information of a neighbor cell. With respect to parallelism parameters, an idle mode history may provide that a reselection was triggered to an inter-frequency neighbor cell (i.e., target cell), and may identify the frequency of the target cell. The serving cell network may be configured such that an inter-frequency reselection process requires around 200 ms for completion. Therefore, using a parallelism scheduling module to run an algorithm or to access a predefined matrix/other data structure, the wireless device processor may identify a possible parallel task combination set as being a PICH decode for performance on one RF resource, and a reselection process of tuning to the target cell frequency to read system information for performance on another RF resource. The divide between RF resources for listening to a paging channel and tuning to a different frequency in this combination set may improve performance by allowing an incoming paging message to still be immediately received by the device, while also allowing the reselection to be easily and quickly stopped.

In determination block 418, the wireless device processor may determine whether the parallelism scheduling module identified at least one parallel task combination set. In response to determining that the wireless device processor did not identify at least one parallel task combination set (i.e., determination block 418="No"), the wireless device processor may remain in normal single-SIM or MSMS/DSDS idle mode operation (i.e., using only the first RF resource) by performing operations of method 530 (see, e.g., FIG. 5B). In some embodiments, the wireless device processor may not identify any parallel task combination sets due to limitations in the wireless device hardware and/or settings associated with the RF resources. For example, in some embodiments the second RF resource may not be configured to receive signals using any of the RATs associated with the first SIM/first RF resource.

In response to determining that at least one parallel task combination set was identified (i.e., determination block 418="Yes"), the wireless device processor may select a parallel task combination set and use the selected set to assign parallel tasks for the first and second RF resources, in block 420. In some embodiments, if only one possible parallel task combination set was identified, that set may be selected automatically. In some embodiments, if multiple possible parallel task combination sets were identified, the wireless device processor may select the combination that achieves the greatest power savings. For example, the power savings may be based on the time saved by parallelism, which may be translated to power savings from power drawn by operation of non-radio components of the wireless device. The wireless device processor may perform operations of the method 550 as described (see, e.g., FIG. 5C).

Figure 5A:
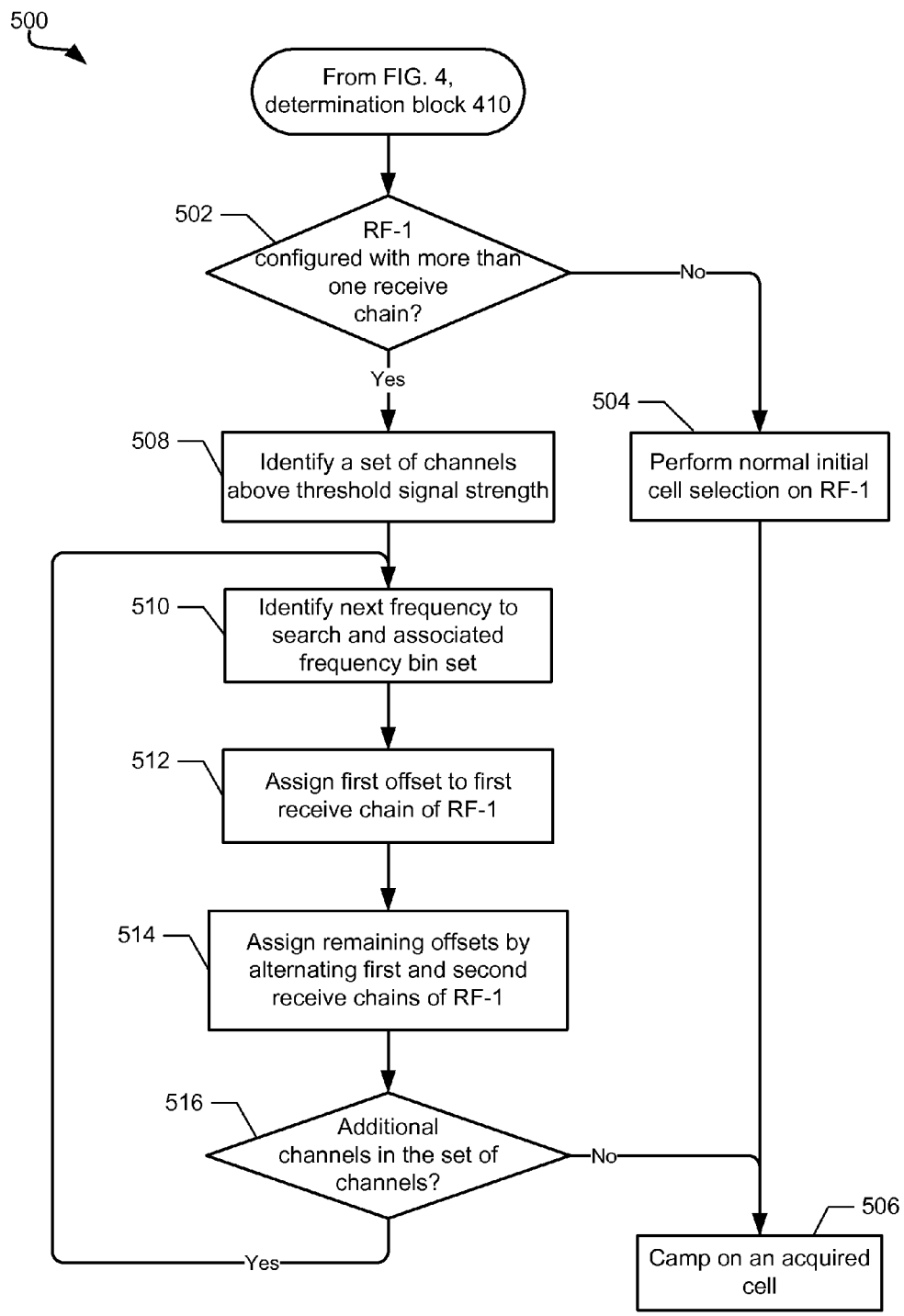
FIGS. 5A-5C are process flow diagrams illustrating methods for improving idle mode power usage and performance of one or more RF resources in an example dual-SIM wireless communication device according to various embodiments.
Figure 5B:
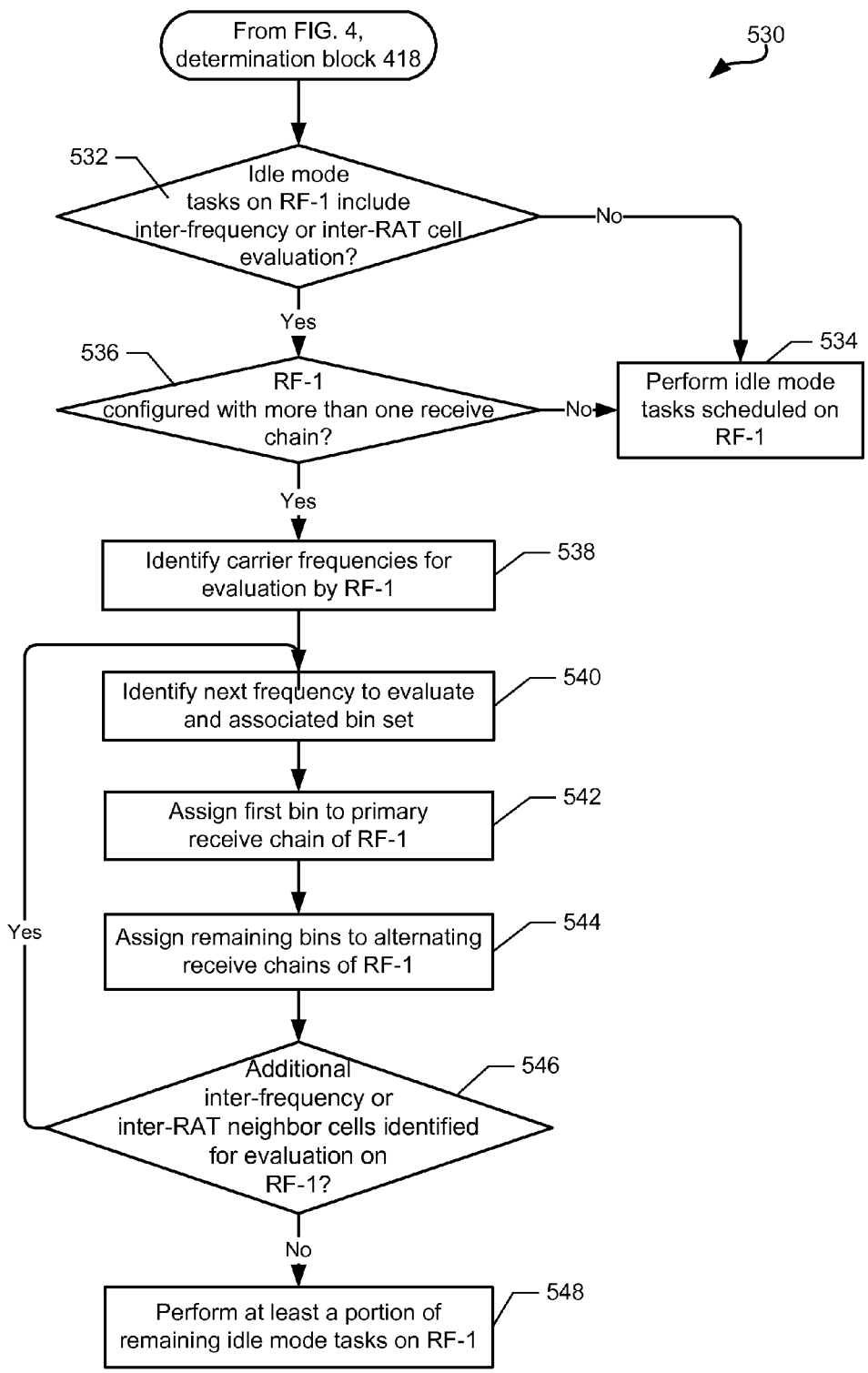
Figure 5C:
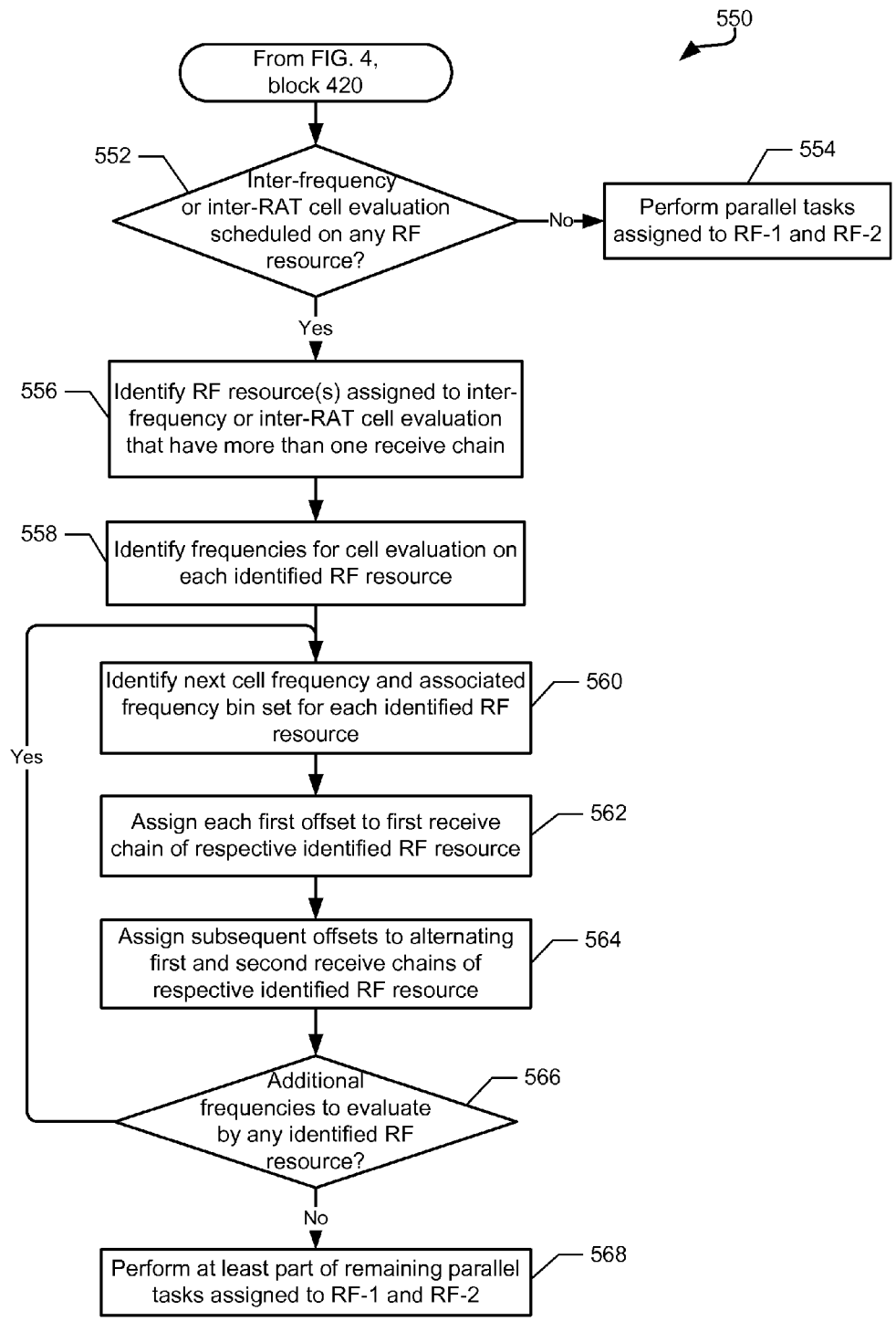

FIGS. 5A-5C illustrate methods 500, 530, 550 for further improving efficiency and performance on individual RF resources of a multi-SIM-multi-active (e.g., DSDA) wireless device (e.g., 102, 200 of FIGS. 1-2) that are scheduled to perform processes requiring tuning to multiple frequencies in the single-SIM or MSMS/DSDS mode according to various embodiments. In various embodiments, the operations of the methods 500, 530, 550 may be implemented by one or more processors of the wireless device, such as the general purpose processor 206 in FIG. 2 and/or baseband modem processor(s) 216, or a separate controller (not shown) that may be coupled to memory (e.g., 214) and to the baseband modem processor(s) 216.

With reference to FIGS. 1-5A, the method 500 may be initiated in response to determining that an initial cell selection (i.e., acquisition) is required on the first RF resource (i.e., determination block 410="Yes" in the method 400 of FIG. 4). In determination block 502, the wireless device processor may determine whether the first RF resource is configured with more than one receive chain. For example, an RF resource may be configured with a primary receive chain and at least one secondary (i.e., diversity) receive chain in order to obtain multiple perspectives of the same received signal to mitigate loss in quality and reliability from multipath distortion.

In response to determining that the first RF resource is not configured with more than one receive chain (i.e., determination block 502="No"), the wireless device processor may perform initial cell selection per normal operation on the first RF resource in block 504. In block 506, the wireless device processor may use the first RF resource to camp on an acquired cell.

In response to determining that initial cell selection is required on the first RF resource (i.e., determination block 502="Yes"), the wireless device processor may identify a set of channels that are above a threshold signal strength in order to search for carrier frequencies, in block 508. In some embodiments, the set of channels may be identified based on a power scan performed on the enabled frequency band. In block 510, the wireless device processor may identify a next frequency to be searched (i.e., the first channel of the set), and may identify a set of bins (i.e., offsets) associated with the frequency. In some embodiments, the offsets may be specified by settings for the serving cell network and stored on the wireless device. In some embodiments, the first offset in various frequency bin sets may be an offset of 0 ppm. Some embodiment frequency bin sets may have, for example, four additional offsets (e.g., 3.5 ppm, −3.5 ppm, 7 ppm, and −7 ppm), for a total of five offsets in the frequency bin set.

In block 512, the wireless device processor may assign the first offset (e.g., 0 ppm) in the frequency bin set to a first receive chain (e.g., a primary receive chain) of the first RF resource. In block 514, the wireless device processor may assign pairs of subsequent/remaining offsets by alternating between the first receive chain and to a second receive chain (e.g., a diversity receive chain). For example, the first and second additional offsets (followed by third and fourth, fifth and sixth, etc.) may be assigned to the first and second receive chains, respectively.

In determination block 516, the wireless device processor may determine whether the set of channels to search for carrier frequencies contains additional channels. In response to determining that the set of channels to search for carrier frequencies contains additional channels (i.e., determination block 516="Yes"), the wireless device processor may repeat the frequency binning process for the next frequency in the channel set in block 510.

In response to determining that the set of channels to search for carrier frequencies does not contain additional channels (i.e., determination block 516="No") or in response to performing normal initial cell selection on the first RF resource in block 504, the wireless device processor may camp on an acquired carrier frequency in block 506.

With reference to FIGS. 1-4 and 5B, the method 530 may be initiated in response to determining that the parallelism scheduling module did not identify any potential parallel task combination sets (i.e., determination block 418="No" in the method 400 of FIG. 4). In determination block 532, the wireless device processor may determine whether the idle-mode tasks assigned to the first RF resource include at least one of inter-frequency cell evaluation and inter-RAT cell evaluation. In response to determining that the idle-mode tasks assigned to the first RF resource do not include at least one of inter-frequency cell evaluation and inter-RAT cell evaluation (i.e., determination block 532="No"), the wireless device processor may perform, per normal operation, the idle-mode tasks that are assigned to the first RF resource per normal operations in block 534.

In response to determining that the idle-mode tasks assigned to the first RF resource include at least one of inter-frequency cell evaluation and inter-RAT cell evaluation (i.e., determination block 532="Yes"), the wireless device processor may determine whether the first RF resource is configured with more than one receive chain in determination block 536. In response to determining that the first RF resource is not configured with more than one receive chain (i.e., determination block 536="No"), the wireless device processor may perform idle-mode tasks in block 534 as described.

In response to determining that the first RF resource is configured with more than one receive chain (i.e., determination block 536="Yes"), the wireless device processor may identify the carrier frequencies for evaluation by the first RF resource in block 538. For example, such carrier frequencies may be some or all of the frequencies associated with inter-frequency neighbor cells, and/or some or all of the frequencies associated with inter-RAT neighbor cells. In block 540, the wireless device processor may identify a next frequency for evaluation by the first RF resource (i.e., the first of the group of inter-frequency or inter-RAT neighbor cells of the set), as well as a set of frequency bins/offsets associated with that next frequency.

In block 542, the wireless device processor may assign the first offset/bin (e.g., 0 ppm) in the frequency bin set to a first receive chain (e.g., a primary receive chain) of the first RF resource. In block 544, the wireless device processor may assign pairs of subsequent offsets by alternating between the first receive chain and to a second receive chain (e.g., a diversity receive chain).

In determination block 546, the wireless device processor may determine whether additional inter-frequency or inter-RAT neighbor cells have been identified for evaluation on the first RF resource. In response to determining that additional inter-frequency or inter-RAT neighbor cells have been identified for evaluation on the first RF resource (i.e., determination block 546="Yes"), the wireless device processor may repeat the frequency binning process in block 540 for the next frequency associated with an inter-frequency or inter-RAT cell evaluation.

In response to determining that additional inter-frequency or inter-RAT neighbor cells have not been identified for evaluation on the first RF resource (i.e., determination block 546="No"), the wireless device processor may perform at least a portion of any additional idle-mode tasks scheduled on the first RF resource in block 548.

With reference to FIGS. 1-4 and 5C, the method 550 may be initiated following assignment of parallel tasks to the first and second RF resources in block 420 of the method 400 (FIG. 4). In determination block 552, the wireless device processor may determine whether the parallel tasks scheduled on any RF resource include inter-frequency cell evaluation and/or inter-RAT cell evaluation. In response to determining that neither inter-frequency cell evaluation nor inter-RAT cell evaluation are included in the parallel tasks assigned to any of the RF resources (i.e., determination block 552="No"), the wireless device processor may perform the assigned parallel tasks on the first and second RF resources during the idle mode wakeup periods in block 554. For example, the second RF resource may be powered on/enabled at the start of the next wakeup period associated with the first RF resource, and may be configured to follow the same power savings mode sleep cycles as the first RF resource.

In response to determining that the parallel tasks assigned to the first RF resource include at least one of inter-frequency cell evaluation and inter-RAT cell evaluation (i.e., determination block 552="Yes"), in block 556 the wireless device processor may identify RF resources for which the parallel tasks include inter-frequency and/or inter-RAT cell evaluation, and that are configured with more than one receive chain. In block 558, the wireless device processor may identify frequencies of neighbor cell evaluation on each of the identified RF resources. In block 560, the wireless device processor may identify a next cell frequency for evaluation by each identified RF resource (i.e., the first of the group of inter-frequency or inter-RAT neighbor cells of the set), as well as a set of frequency bins/offsets associated with that next frequency.

In block 562, for each identified RF resource, the wireless device processor may assign the first offset (e.g., 0 ppm) in the frequency bin set to the first receive chain (e.g., a primary receive chain) of the respective RF resource. In block 564, the wireless device processor may assign pairs of subsequent offsets by alternating between the first receive chain and to a second receive chain (e.g., a diversity receive chain) of the respective RF resource.

In determination block 566, the wireless device processor may determine whether additional inter-frequency or inter-RAT neighbor cells have been identified for evaluation on any identified RF resource. In response to determining that additional inter-frequency or inter-RAT neighbor cells have been identified on any identified RF resource evaluation on the first RF resource (i.e., determination block 566="Yes"), the wireless device processor may repeat the frequency binning process in block 560 for the next frequency associated with an inter-frequency or inter-RAT cell evaluation on each identified RF resource. In response to determining that additional inter-frequency or inter-RAT neighbor cells have not been identified for evaluation on an any identified RF resource (i.e., determination block 566="No"), the wireless device processor may perform at least part of any remaining parallel tasks assigned to the first and second RF resources in block 568.

As discussed, the references to first RF resource/RF-1 and second RF resource/RF-2, as well as to first SIM/SIM-1 and second SIM/SIM-2, are arbitrary, and may apply to either or any SIM and/or RF resource of the wireless device. For example, while various embodiments and claims refer to performing idle-mode tasks for a first RF resource, assisted by simultaneous use of a second RF resource, the various embodiments and claims are equally applicable to performing idle-mode tasks for a first RF resource assisted by simultaneous use of the first RF resource. Further, such designations of SIMs and/or RF resources may be switched or reversed between instances of executing the methods herein.

Figure 6:
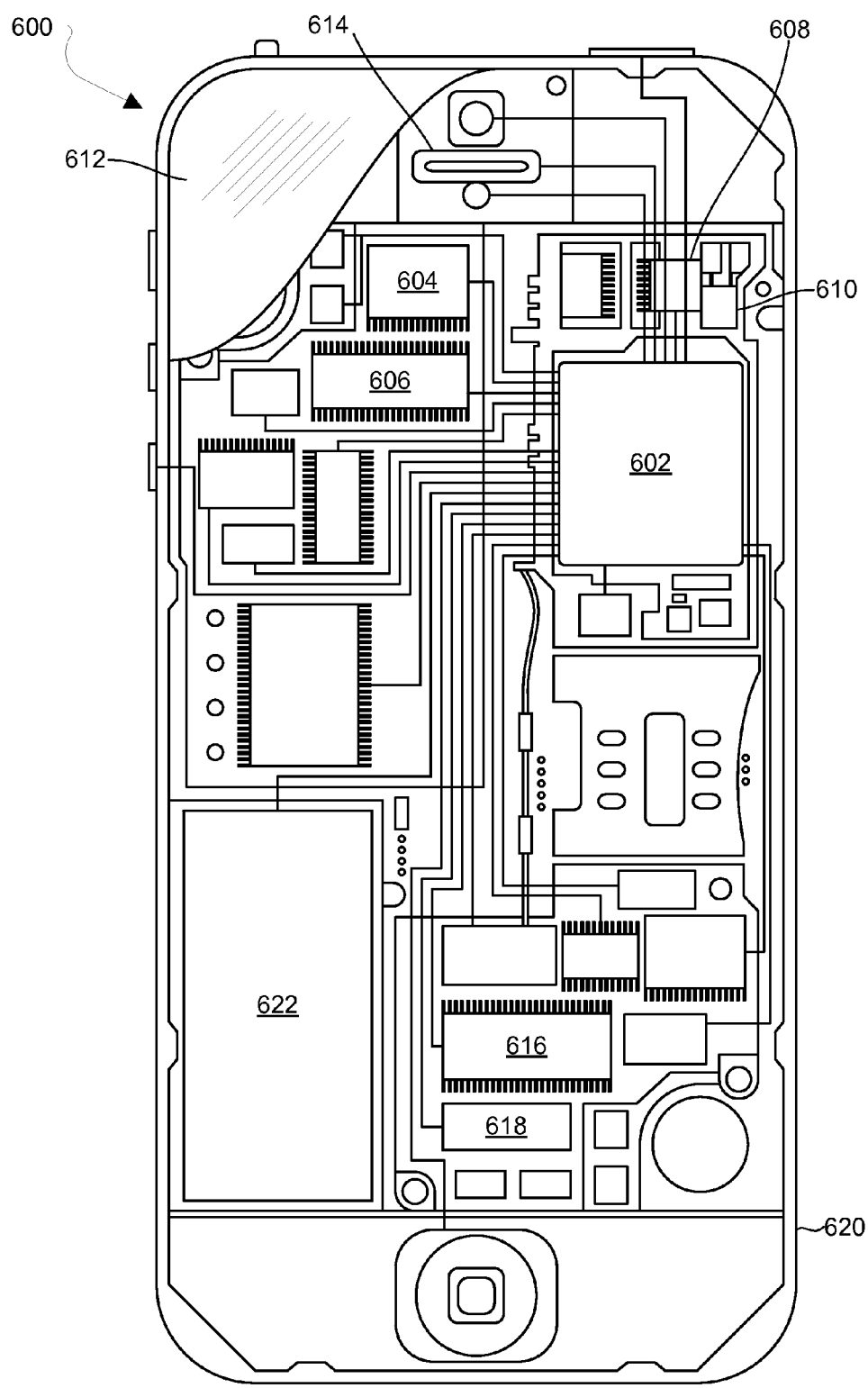
FIG. 6 is a component diagram of an example wireless device suitable for use with various embodiments.

Various embodiments may be implemented in any of a variety of wireless devices, an example of which is illustrated in FIG. 6. For example, the wireless device 600 (which may correspond, for example, the wireless devices 102, 200 in FIGS. 1-2) may include a processor 602 coupled to a touchscreen controller 604 and an internal memory 606. The processor 602 may be one or more multicore integrated circuits (ICs) designated for general or specific processing tasks. The internal memory 606 may be volatile or nonvolatile memory, and may also be secure and/or encrypted memory, or unsecure and/or unencrypted memory, or any combination thereof.

The touchscreen controller 604 and the processor 602 may also be coupled to a touchscreen panel 612, such as a resistive-sensing touchscreen, capacitive-sensing touchscreen, infrared sensing touchscreen, etc. The wireless device 600 may have one or more radio signal transceivers 608 (e.g., Peanut®, Bluetooth®, Zigbee®, Wi-Fi, RF radio) and antennae 610, for sending and receiving, coupled to each other and/or to the processor 602. The transceivers 608 and antennae 610 may be used with the above-mentioned circuitry to implement the various wireless transmission protocol stacks and interfaces. The wireless device 600 may include a cellular network wireless modem chip 616 that enables communication via a cellular network and is coupled to the processor. The wireless device 600 may include a peripheral device connection interface 618 coupled to the processor 602. The peripheral device connection interface 618 may be singularly configured to accept one type of connection, or multiply configured to accept various types of physical and communication connections, common or proprietary, such as USB, FireWire, Thunderbolt, or PCIe. The peripheral device connection interface 618 may also be coupled to a similarly configured peripheral device connection port (not shown). The wireless device 600 may also include speakers 614 for providing audio outputs. The wireless device 600 may also include a housing 620, constructed of a plastic, metal, or a combination of materials, for containing all or some of the components discussed herein. The wireless device 600 may include a power source 622 coupled to the processor 602, such as a disposable or rechargeable battery. The rechargeable battery may also be coupled to the peripheral device connection port to receive a charging current from a source external to the wireless device 600.

Figure 7:
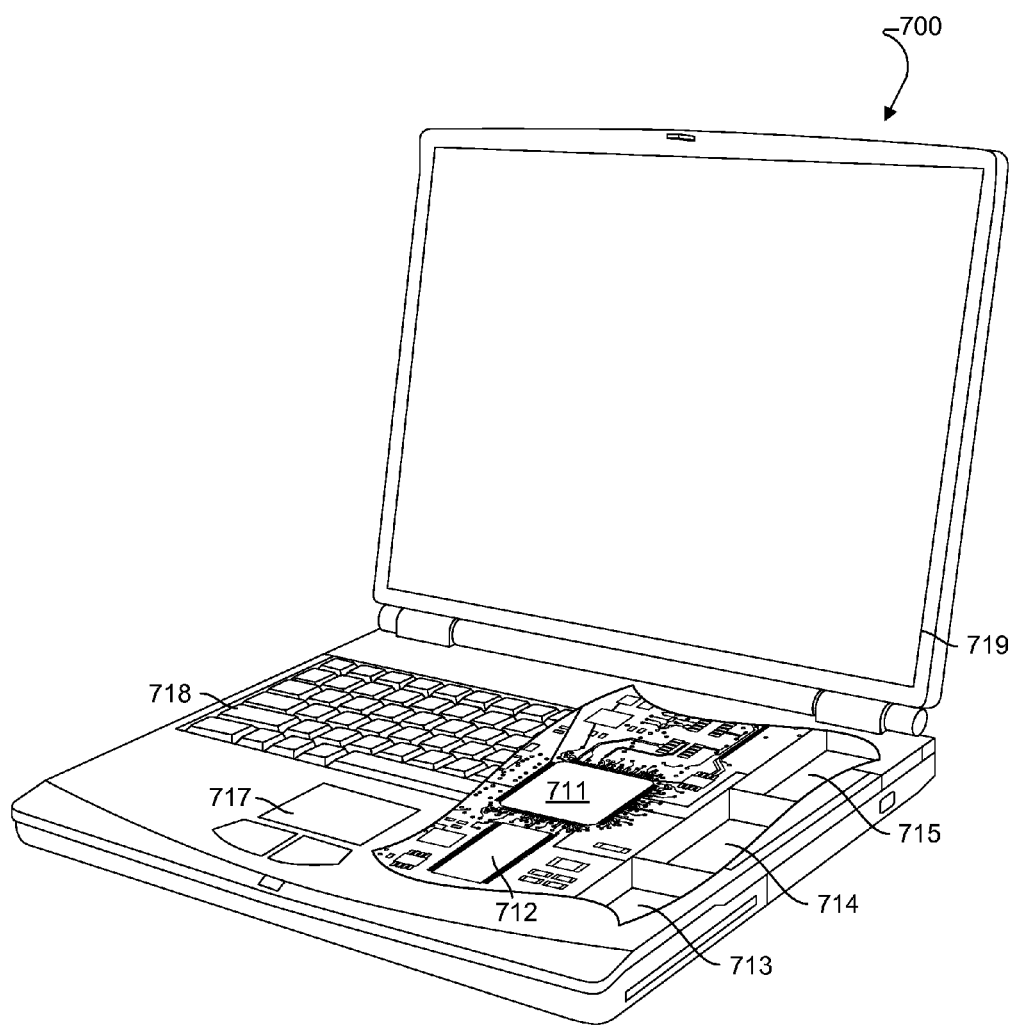
FIG. 7 is a component diagram of another example wireless device suitable for use with various embodiments.

Various embodiments described above may also be implemented within a variety of personal computing devices, such as a laptop computer 700 (which may correspond, for example, the wireless devices 102, 200 in FIGS. 1-2) as illustrated in FIG. 7. Many laptop computers include a touchpad touch surface 717 that serves as the computer's pointing device, and thus may receive drag, scroll, and flick gestures similar to those implemented on wireless computing devices equipped with a touch screen display and described above. The laptop computer 700 will typically include a processor 711 coupled to volatile memory 712 and a large capacity nonvolatile memory, such as a disk drive 713 of Flash memory. The laptop computer 700 may also include a floppy disc drive 714 and a compact disc (CD) drive 715 coupled to the processor 711. The laptop computer 700 may also include a number of connector ports coupled to the processor 711 for establishing data connections or receiving external memory devices, such as a USB or FireWire® connector sockets, or other network connection circuits for coupling the processor 711 to a network. In a notebook configuration, the computer housing includes the touchpad touch surface 717, the keyboard 718, and the display 719 all coupled to the processor 711. Other configurations of the computing device may include a computer mouse or trackball coupled to the processor (e.g., via a USB input) as are well known, which may also be use in conjunction with various embodiments.

The processors 602 and 711 may be any programmable microprocessor, microcomputer or multiple processor chip or chips that can be configured by software instructions (applications) to perform a variety of functions, including the functions of various embodiments described above. In some devices, multiple processors may be provided, such as one processor dedicated to wireless communication functions and one processor dedicated to running other applications. Typically, software applications may be stored in the internal memory 606, 712 and 713 before they are accessed and loaded into the processors 602 and 711. The processors 602 and 711 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 602, 711, including internal memory or removable memory plugged into the device and memory within the processor 602 and 711, themselves.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a SIM and data receiving associated with a different SIM, such identifiers are merely for convenience and are not meant to limit the various embodiments to a particular order, sequence, type of network or carrier.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of improving performance of a multi-subscriber-identification-module (multi-SIM) wireless communication device having a first radio frequency (RF) resource associated with at least a first SIM and a second RF resource associated with a second SIM, wherein the first RF resource is enabled to support operations on at least the first SIM, the method comprising:
    detecting that the second RF resource is in a deactivated state;
    determining whether the first RF resource is in idle mode; and
    in response to determining that the first RF resource is in idle mode:
        identifying idle-mode tasks associated with the first SIM to be performed by the first RF resource;
        identifying parallelism parameters that provide criteria to assist scheduling simultaneous idle-mode tasks;
        identifying possible parallel task combination sets based on the identified idle-mode tasks associated with the first SIM and the parallelism parameters;
        selecting a parallel task combination set; and
        assigning at least one of the identified idle-mode tasks associated with the first SIM to each of the first and second RF resources according to the selected parallel task combination set.

2. The method of claim 1, further comprising activating the second RF resource and simultaneously performing, on the first and second RF resources, the at least one assigned idle-mode task during a wake-up period of at least one subsequent power saving mode cycle associated with the first RF resource.

3. The method of claim 2, wherein the at least one assigned idle-mode task associated with the first SIM comprises one of an evaluation of intra-frequency cells, an evaluation of inter-frequency cells, and an evaluation of inter-radio-access-technology (inter-RAT) cells.

4. The method of claim 1, wherein identifying possible parallel task combination sets is performed by inputting the identified idle-mode tasks and the parallelism parameters to a rule engine.

5. The method of claim 1, wherein identifying possible parallel task combination sets is performed using the one identified idle-mode tasks and the parallelism parameters to locate information in a data structure stored on the wireless communication device.

6. The method of claim 1, wherein the parallelism parameters include at least one of:
    a duration of a wake-up period of a power saving mode cycle associated with the first RF resource;
    a history of recent idle mode activity for the first RF resource;
    information identifying radio access technologies supported by each of the first and second RF resources;
    information identifying radio access technologies and frequency bands enabled by the first SIM;
    a number of entries in a neighbor cell list; and
    channel conditions of a serving cell.

7. The method of claim 1, wherein:
    the assigned idle-mode tasks comprise decoding a paging channel of a serving cell and reading system information of a target cell during reselection; and
    the method further comprises:
        determining whether the first SIM has received a paging message in the serving cell; and
        stopping the reselection to the target cell in response to determining that the first SIM has received a paging message in the serving cell.

8. The method of claim 1, further comprising:
    identifying each RF resource for which the at least one assigned idle-mode task associated with the first SIM comprises at least one of an inter-frequency cell evaluation and an inter-RAT cell evaluation;
    identifying a set of neighbor cell frequencies for evaluation by each identified RF resource;
    identifying, for each set of neighbor cell frequencies, an associated frequency bin set; and
    for each frequency in the identified sets of neighbor cell frequencies:

assigning a first frequency offset in the associated bin set to a first receive chain of the identified RF resource; and alternating assignment of remaining frequency offsets between the first receive chain and a second receive chain of the identified RF resource.

9. The method of claim 1, wherein selecting the parallel task combination set comprises:

determining whether at least one possible parallel task combination set is identified;

determining whether multiple possible parallel task combination sets are identified in response to determining that at least one possible parallel task combination set is identified; and comparing power usage savings that would result from implementing each of the possible parallel task combination sets in response to determining that multiple possible parallel task combination sets are identified.

10. The method of claim 9, wherein selecting the parallel task combination set further comprises:

comparing performance gains that would result from implementing each of the possible parallel task combination sets in response to determining that multiple possible parallel task combination sets are identified.

11. The method of claim 9, wherein the power usage savings that would result from implementing each of the possible parallel task combination sets is based on a reduction in time required to complete actions performed in parallel by the first and second RF resources from time required to complete the actions performed in sequence by the first RF resource.

12. The method of claim 9, further comprising performing the identified idle-mode tasks on the first RF resource in response to determining that at least one possible parallel task combination set is not identified.

13. The method of claim 1, further comprising:

determining whether an initial cell selection process is required on the first RF resource in response to determining that the first RF resource is not idle mode; and in response to determining that an initial cell selection process is required on the first RF resource:

identifying a group of channels above a threshold signal strength, wherein the channels in the identified group of channels are searched as potential carrier frequencies;

identifying a frequency bin set associated with the group of channels; and for each channel in the identified group of channels:

assigning a first frequency offset in the associated bin set to a first receive chain of the first RF resource;

alternating assignment of remaining frequency offsets between the first receive chain and a second receive chain of the first RF resource; and determining whether the channel is a carrier frequency by tuning to an adjusted frequency associated with each assigned offset using the associated first or second receive chain.

14. A wireless communication device, comprising:

a first radio-frequency (RF) resource configured to be associated with a first subscriber identification module (SIM), wherein the first RF resource is enabled to support operations on at least the first SIM;

a second RF resource configured to be associated with a second SIM; and a processor coupled to the first and second RF resources and configured to be coupled to the first and second SIMs, wherein the processor is configured to:

detect that the second RF resource is in a deactivated state;

determine whether the first RF resource is in idle mode; and in response to determining that the first RF resource is in idle mode:

identify idle-mode tasks associated with the first SIM to be performed by the first RF resource;

identify parallelism parameters that provide criteria to assist scheduling simultaneous idle-mode tasks;

identify possible parallel task combination sets based on the identified idle-mode tasks associated with the first SIM and the parallelism parameters;

select a best parallel task combination set; and assign at least one of the identified idle-mode tasks associated with the first SIM to each of the first and second RF resources according to the selected parallel task combination set.

15. The wireless communication device of claim 14, wherein the processor is further configured to activate the second RF resource and simultaneously perform, on the first and second RF resources, the assigned idle-mode tasks during a wake-up period of at least one subsequent power saving mode cycle associated with the first RF resource.

16. The wireless communication device of claim 15, wherein the at least one of the identified idle-mode tasks assigned to each of the first and second RF resources comprises one of an evaluation of intra-frequency cells, an evaluation of inter-frequency cells, and an evaluation of inter-radio-access-technology (inter-RAT) cells, and wherein simultaneously performing the assigned idle-mode tasks decreases time required to complete an evaluation of all neighbor cells.

17. The wireless communication device of claim 14, wherein the processor is further configured to input the identified idle-mode tasks and the parallelism parameters to a rule engine.

18. The wireless communication device of claim 14, wherein the processor is further configured to use the identified idle-mode tasks and the parallelism parameters to locate information in a data structure stored on the wireless communication device.

19. The wireless communication device of claim 14, wherein the parallelism parameters include at least one of:

a duration of a wake-up period of a power saving mode cycle associated with the first RF resource;

a history of recent idle mode activity for the first RF resource;

information identifying radio access technologies supported by each of the first and second RF resources;

information identifying radio access technologies and frequency bands enabled by the first SIM;

a number of entries in a neighbor cell list; and channel conditions of a serving cell.

20. The wireless communication device of claim 14, wherein:

the at least one of the identified idle-mode tasks assigned to the first RF resource comprises decoding a paging channel of a serving cell;

the at least one of the identified idle-mode tasks assigned to the second RF resource comprises reading system information of a target cell during reselection; and the processor is further configured to:

determine whether the first SIM has received a paging message in the serving cell; and stop the reselection to the target cell in response to determining that the first SIM has received a paging message in the serving cell.

21. The wireless communication device of claim 14, wherein the processor is further configured to
identify each RF resource for which the at least one assigned idle-mode task associated with the first SIM comprises at least one of an inter-frequency cell evaluation and an inter-RAT cell evaluation;
identify a set of neighbor cell frequencies for evaluation by each identified RF resource;
identify, for each set of neighbor cell frequencies, an associated frequency bin set; and
for each frequency in the identified sets of neighbor cell frequencies:
assign a first frequency offset in the associated bin set to a first receive chain of the identified RF resource; and
alternate assignment of remaining frequency offsets between the first receive chain and a second receive chain of the identified RF resource.

22. The wireless communication device of claim 14, wherein the processor is further configured to:
determine whether at least one possible parallel task combination set is identified;
determine whether multiple possible parallel task combination sets are identified in response to determining that at least one possible parallel task combination set is identified; and
compare power usage savings that would result from implementing each of the possible parallel task combination sets in response to determining that multiple possible parallelism task combination sets are identified.

23. The wireless communication device of claim 22, wherein the processor is further configured to compare performance gains that would result from implementing each of the possible parallel task combination sets in response to determining that multiple possible parallel task combination sets are identified.

24. The wireless communication device of claim 22, wherein the power usage savings that would result from implementing each of the possible parallel task combination sets is based on a reduction in time required to complete actions performed in parallel by the first and second RF resources from time required to complete the actions performed in sequence by the first RF resource.

25. The wireless communication device of claim 22, wherein the processor is further configured to perform the identified idle-mode tasks on the first RF resource in response to determining that at least one possible parallelism task combination set is not identified.

26. The wireless communication device of claim 14, wherein the processor is further configured to:
determine whether an initial cell selection process is required on the first RF resource in response to determining that the first RF resource is not idle mode; and
in response to determining that an initial cell selection process is required on the first RF resource:
identify a group of channels above a threshold signal strength, wherein the channels in the identified group of channels are searched as potential carrier frequencies;
identify a frequency bin set associated with the group of channels; and
for each channel in the identified group of channels:
assign a first frequency offset in the associated bin set to a first receive chain of the first RF resource;
alternate assignment of remaining frequency offsets between the first receive chain and a second receive chain of the first RF resource; and
determine whether the channel is a carrier frequency by tuning to an adjusted frequency associated with each assigned offset using the associated first or second receive chain.

27. A wireless communication device, comprising:
a first radio-frequency (RF) resource associated with a first subscriber identification module (SIM), wherein the first RF resource is enabled to support operations on at least the first SIM;
a second RF resource associated with a second SIM;
means for detecting that the second RF resource is in a deactivated state;
means for determining whether the first RF resource is in idle mode; and
in response to determining that the first RF resource is in the idle mode:
means for identifying idle-mode tasks associated with the first SIM to be performed by the first RF resource in response to determining that the first RF resource is in idle mode;
means for identifying parallelism parameters that provide criteria to assist scheduling simultaneous idle-mode tasks;
means for identifying possible parallel task combination sets based on the identified idle-mode tasks associated with the first SIM and the parallelism parameters;
means for selecting a best parallel task combination set; and
means for assigning, according to the selected parallel task combination set, at least one of the identified idle-mode tasks associated with the first SIM to each of the first RF resource and a second RF resource associated with a second SIM when the first RF resource is in idle mode.

28. A non-transitory processor-readable medium having stored thereon processor-executable instructions configured to cause a processor of a wireless communication device configured with a first radio-frequency (RF) resource associated with at least a first subscriber identification module (SIM) and a second RF resource associated with a second SIM to perform operations comprising:
detecting that the second RF resource is in a deactivated state;
determining whether the first RF resource is in idle mode, wherein the first RF resource is enabled to support operations on at least the first SIM; and
in response to determining that the first RF resource is in idle mode:
identifying idle-mode tasks associated with the first SIM to be performed by the first RF resource;
identifying parallelism parameters that provide criteria to assist scheduling simultaneous idle-mode tasks;
identifying possible parallel task combination sets based on the identified idle-mode task and the parallelism parameters;
selecting a best parallel task combination set; and
assigning, according to the selected parallel task combination set, at least one of the identified idle-mode tasks associated with the first SIM to each of the first RF resource and the second RF resource.

29. The non-transitory processor-readable medium of claim 28, wherein the stored processor-executable instructions are configured to cause the wireless communication device processor to:
perform operations such that the at least one of the identified idle-mode tasks assigned to the first RF resource comprises decoding a paging channel of a serving cell, and the at least one parallel task assigned to the second RF resource comprises reading system information of a target cell during reselection; and
perform operations further comprising:
determining whether the first SIM has received a paging message in the serving cell; and
stopping the reselection to the target cell in response to determining that the first SIM has received a paging message in the serving cell.

30. The non-transitory processor-readable medium of claim 28, wherein the stored processor-executable instructions are configured to cause the wireless communication device processor to perform operations further comprising:
identifying each RF resource for which the at least one assigned idle-mode task associated with the first SIM comprises at least one of an inter-frequency cell evaluation and an inter-RAT cell evaluation;
identifying a set of neighbor cell frequencies for evaluation by each identified RF resource;
identifying, for each set of neighbor cell frequencies, an associated frequency bin set; and
for each frequency in the identified sets of neighbor cell frequencies:
assigning a first frequency offset in the associated bin set to a first receive chain of the identified RF resource; and
alternating assignment of remaining frequency offsets between the first receive chain and a second receive chain of the identified RF resource.

\* \* \* \* \*